US012249301B2

(12) United States Patent
Haaheim

(10) Patent No.: US 12,249,301 B2
(45) Date of Patent: Mar. 11, 2025

(54) CONTROLLED DENSITY-GRADIENT TIMPANI PERCUSSION MALLETS

(71) Applicant: Jason Haaheim, New York, NY (US)

(72) Inventor: Jason Haaheim, New York, NY (US)

( * ) Notice: Subject to any disclaimer, the term of this patent is extended or adjusted under 35 U.S.C. 154(b) by 0 days.

(21) Appl. No.: 16/625,850

(22) PCT Filed: Jun. 26, 2018

(86) PCT No.: PCT/US2018/039516
§ 371 (c)(1),
(2) Date: Dec. 23, 2019

(87) PCT Pub. No.: WO2019/005804
PCT Pub. Date: Jan. 3, 2019

(65) Prior Publication Data
US 2020/0126523 A1 Apr. 23, 2020

Related U.S. Application Data

(60) Provisional application No. 62/525,573, filed on Jun. 27, 2017.

(51) Int. Cl.
*G10D 13/12* (2020.01)

(52) U.S. Cl.
CPC .................................... *G10D 13/12* (2020.02)

(58) Field of Classification Search
CPC ...................................................... G10D 13/12
See application file for complete search history.

(56) References Cited

U.S. PATENT DOCUMENTS 1,739,275 A 12/1929 Zipperstein
2,521,336 A 9/1950 Bramson
3,146,659 A 9/1964 Robba et al.
(Continued)

FOREIGN PATENT DOCUMENTS

DE 10 242 977 A1 3/2004
DE 10 2015 120 677 A1 6/2016

*Primary Examiner* — Jianchun Qin
(74) *Attorney, Agent, or Firm* — The Marbury Law Group, PLLC

(57) ABSTRACT

A timpani percussion mallet for use with a timpani musical instrument by a timpani player, the mallet comprising: a shaft having a first end that is for a timpani player to hold, and also having an opposite second end that is for the timpani player striking a part of the timpani musical instrument, wherein the shaft comprises at least one tube with outer walls, wherein the tube contains within the outer walls a plurality of segments including a first segment comprising a first solid segment material and a second solid segment comprising a second segment material different from the first solid segment material, and optional additional segments with optional additional solid segment materials, wherein the first and second segments are each non-movable within the tube, wherein the first segment is located closer to the first end, and the second segment is located closer to the second end, wherein the first segment and the second segment have different densities to provide the timpani percussion mallet and shaft with a controlled density gradient to control center of mass, moment of inertia, and/or vibration mitigation for the timpani percussion mallet. A palette of mallets and sounds are provided for the elite player.

18 Claims, 25 Drawing Sheets

(56) References Cited

U.S. PATENT DOCUMENTS

| | | | | | |
|---|---|---|---|---|---|
| 3,147,660 | A * | 9/1964 | Brilhart | G10D 13/12 | 984/150 |
| 3,422,719 | A | 1/1969 | Payson | | |
| 3,489,052 | A * | 1/1970 | Colyer | G10D 13/12 | 84/422.4 |
| 3,585,897 | A | 6/1971 | Stalcup | | |
| 3,665,799 | A | 5/1972 | Hinger | | |
| 3,727,295 | A * | 4/1973 | Gildemeister | A63B 59/56 | 29/527.3 |
| 3,958,485 | A | 5/1976 | Peters | | |
| 3,998,123 | A | 12/1976 | Hinger | | |
| 4,047,460 | A | 9/1977 | Fiedler et al. | | |
| 4,114,503 | A | 9/1978 | Petillo | | |
| 4,202,241 | A * | 5/1980 | Lucas | G10D 13/12 | 984/150 |
| 4,300,438 | A | 11/1981 | Handal | | |
| 4,307,647 | A | 12/1981 | Christian | | |
| 4,320,688 | A * | 3/1982 | Donohoe | G10D 13/12 | 84/422.4 |
| 4,632,006 | A | 12/1986 | Ambroszewski | | |
| 4,649,792 | A | 3/1987 | Swartzlander | | |
| 4,905,566 | A | 3/1990 | Hughlett et al. | | |
| 5,218,152 | A | 6/1993 | Campbell et al. | | |
| 5,341,716 | A * | 8/1994 | Donohoe | G10D 13/12 | 84/422.4 |
| 5,447,088 | A | 9/1995 | Mester | | |
| 5,602,355 | A | 2/1997 | Lipp | | |
| 6,028,260 | A | 2/2000 | LaLonde | | |
| 6,152,840 | A * | 11/2000 | Baum | B29C 70/088 | 473/567 |
| 6,307,138 | B1 | 10/2001 | Simpson | | |
| 6,653,541 | B1 | 11/2003 | Minker | | |
| 6,759,583 | B2 | 7/2004 | Mizuno et al. | | |
| 7,439,434 | B1 | 10/2008 | Cole et al. | | |
| 7,538,264 | B1 | 5/2009 | Turos | | |
| 7,626,108 | B1 | 12/2009 | Takegawa | | |
| 7,868,237 | B1 | 1/2011 | Quilon | | |
| 7,906,719 | B2 | 3/2011 | Seymour | | |
| 8,163,989 | B2 | 4/2012 | Richard | | |
| 8,981,194 | B2 | 3/2015 | Grossman | | |
| 8,987,569 | B2 | 3/2015 | Huber | | |
| 9,626,943 | B1 | 4/2017 | Hughlett | | |
| 2004/0231493 | A1 | 11/2004 | Milne et al. | | |
| 2011/0166820 | A1 | 7/2011 | Hughlett | | |
| 2011/0247477 | A1* | 10/2011 | Chang | G10D 13/12 | 84/422.4 |

* cited by examiner

Timpani Mallet Anatomy

Prior art attempts...

Prior art attempts...

Prior art attempts...

Shaft specifications

Shaft specifications

Shaft specifications

Figure 9

Center of mass calculation

Each filling component can be modeled as a point-mass at its exact midpoint, and so:

$Z_{cm}$ (center of mass) $= \frac{m_1 z_1 + m_2 z_2 + m_3 z_3}{m_1 + m_2 + m_3}$ Therefore, in order to predictably tailor the Center of Mass (i.e., mallet balance), all we need to know is the density of the fill material (a readily available material property) and then control the different fill lengths ($l_1$, $l_2$, $l_3$) during fabrication.

We can use as many or as few different fills as we want to create a density gradient.

A pseudo-continuous density gradient could be easily calculated modeling it as a series of i.e., 1000 slices of $l_1 + l_2 + l_3 + \ldots + l_{1000}$ …with 1000 gradations of density $\rho_1 + \rho_2 + \rho_3 + \ldots + \rho_{1000}$ …resulting in 1000 gradations of mass $m_1 + m_2 + m_3 + \ldots + m_{1000}$ And calculated as $Z_{cm}$ (center of mass) $= \frac{m_1 z_1 + m_2 z_2 + m_3 z_3 + \ldots + m_{1000} z_{1000}}{m_1 + m_2 + m_3 + \cdots + m_{1000}}$ A truly continuous gradient would be achieved as $1000 \rightarrow \infty$

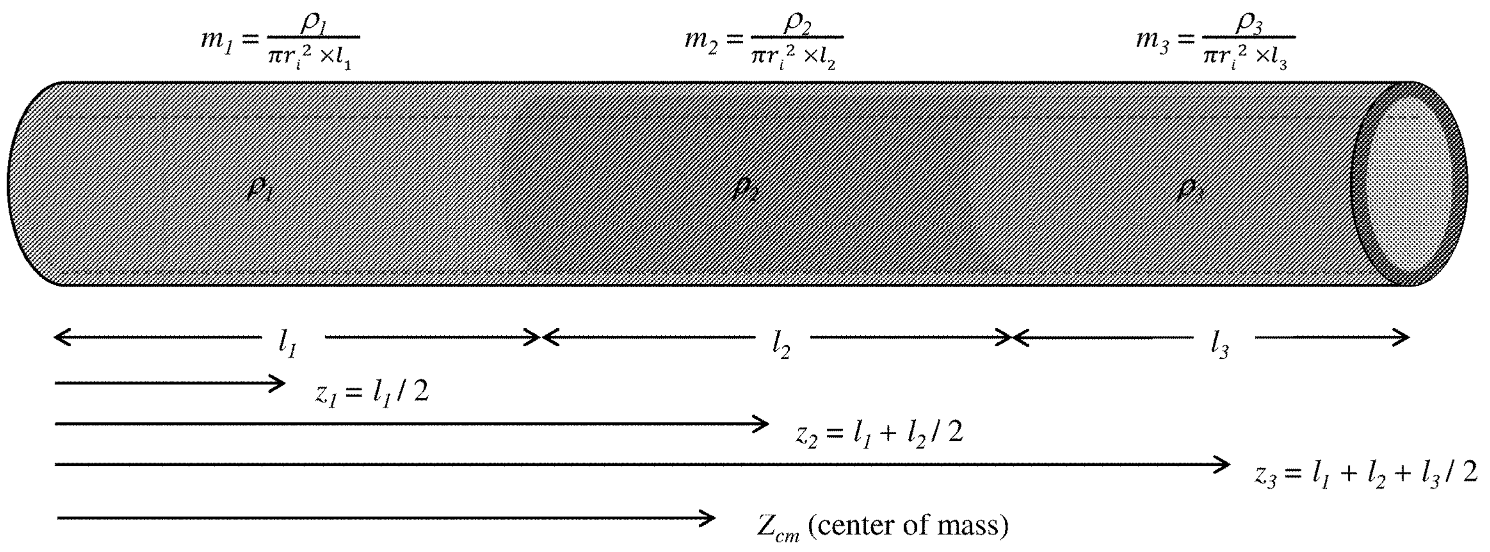

Figure 10

Center of mass calculation

Moreover, these fillings can be radially nested as design may require.
For example, an object of density $\rho_4$ can be nested inside fill material #3 as shown.

The mass calculation changes as shown, with the resulting center of mass tailoring remaining the same:

$$Z_{cm} \text{ (center of mass)} = \frac{m_1 z_1 + m_2 z_2 + m_{34} z_3}{m_1 + m_2 + m_3}$$

$$m_{34} = \frac{\rho_3}{\pi r_i^2 \times l_3} - \frac{\rho_3}{\pi r_4^2 \times l_3} + \frac{\rho_4}{\pi r_4^2 \times l_3}$$

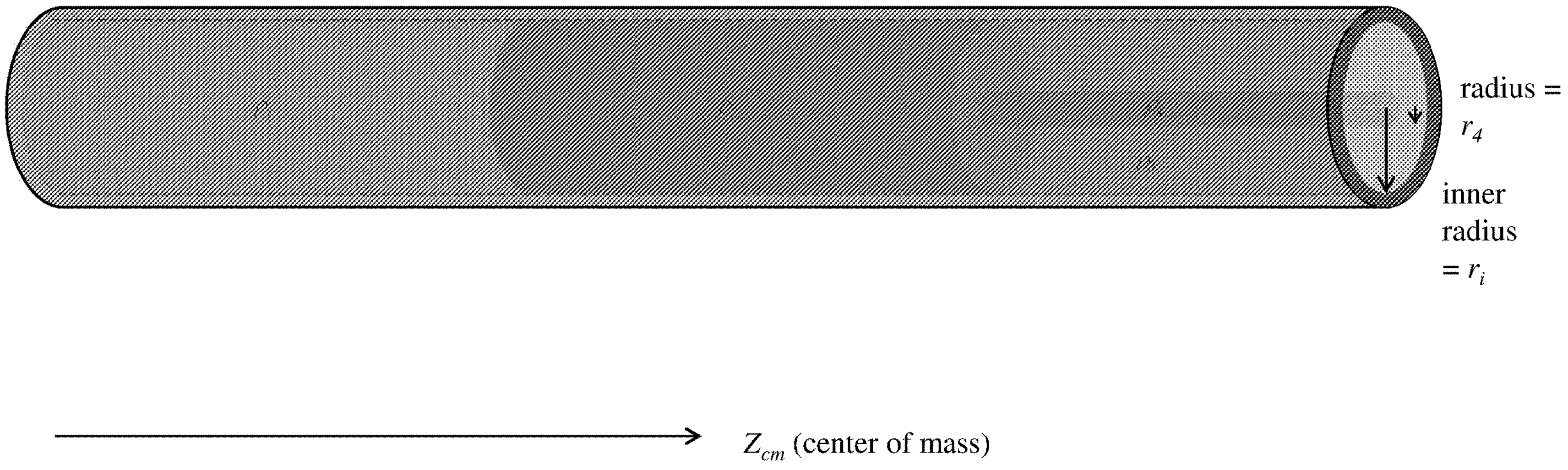

CONTROLLED DENSITY-GRADIENT TIMPANI PERCUSSION MALLETS

CROSS-REFERENCE TO RELATED APPLICATIONS

This application is a U.S. national stage filing based on International Application No. PCT/US2018/039516, filed Jun. 26, 2018, which claims the priority benefit of U.S. Provisional Application No. 62/525,573, filed Jun. 27, 2017, both of which applications are hereby incorporated in their entirety for all purposes.

BACKGROUND

Although percussion instrumentation, including timpani mallets, have been developed extensively, a long felt need exists to provide improved percussion instrumentation to serve the highest, most elite levels of musical performance with the widest possible palette of sounds. A percussionist, particularly a timpani percussionist, needs to control both the fundamental tone and the series of overtones (harmonics) that provide a particularly unique sound.

Many variables can affect the sound created by timpani such as, for example, the brand of timpani (i.e., design, materials, and the like), the brand of the drum head, the size of the drum head, the drum head material, the tension of the drum head (i.e., pitch), among others. But one of the most important variables is the drum stick itself, i.e., the timpani mallet. The timpani mallet has arguably the biggest overall impact on the type of sound created, evident to even untrained musicians. For this reason, timpanists tend to own and use many different kinds of mallets, even within the same performance.

When one discusses "sound," what is typically meant, more specifically, is "tone"—the characteristic "fingerprint" of the sound comprising different frequencies at different relative amplitudes. Like most tonal instruments, timpani tone has a fundamental tone, on top of which are a series of overtones (or harmonics) that give it its particular unique sound. So when one says that elite players desire a wide palette of sound, this means that for any given fundamental pitch, elite players want a high degree of control over the harmonics produced and their relative amplitudes.

Since musicians typically do not communicate amongst themselves using physics and acoustics parlance, shorthand terms have developed to stand in for acoustics descriptions. For example, "bright" typically means a tone where the higher overtones have greater amplitude, and the lower overtones have less amplitude. "Dark" typically means the inverse—a tone where the fundamental and lower overtones are amplified, and the higher overtones are less present. (Some musicians may also substitute "warm" for "dark," and "cool" for "bright.")

In a simplified context, one could map the tone on a 1D axis ranging from "bright" to "dark," where the variable is the relative strengths of the high versus low harmonics. However, tones exist in time. Any musical tone will have an attack, a sustain, and a release. Timpani and percussion instruments are fairly unique, however, in that players typically don't have control over the "release"—the instrument is struck, there is an immediate attack tone, and then a sustain tone which decays. For the purposes of this discussion, there is no "release."

Therefore, there are two components of tone we need to consider with respect to time: the attack, and the sustain. These can be plotted and visualized on a 2D axis as seen in FIG. 1 with a convenient corollary found in the consonants and vowels of words. A "hard" attack with a "bright" sustain would be a word like "Keen." Soften the attack and ones gets "Mean." Darken the sustain and one gets "Moon." Harden the attack again and one gets "Croon." Examining vowel sounds like "eeeeeeeee" on a spectrum analyzer shows more dominant high harmonics; lower harmonics dominate for a vowel like "0000000000." Timpani sustain tone can modeled very similarly.

This 2D palette tonal concept allows a sensitive musician to intentionally navigate through the tones they're producing, ranging throughout the extremes of the "tonal terrain" permitted by the instrument, their technique, and their mallets. Elite players may approach this in a manner wherein different types of music and different composers can occupy different regions of this palette of tonal possibilities in the 2D palette of FIG. 1. This is one way that the finest players in the finest orchestras can make Brahms sound qualitatively different from Mozart, even though they may be playing the same pitches on the same instruments in the same hall with the same conductor. Successfully navigating the full range of the FIG. 1 tonal terrain is easiest using timpani mallets with tailored balance; however, the problem that exists in the prior art is that timpani mallets have not possessed tailored balance across the range of mallet masses necessary to access the full tonal terrain.

FIG. 2 illustrates a typical timpani mallet anatomy in the prior art, showing a shaft, a core, a wrap, and a center of mass, wherein one end (a first end) is held by the player and the other end (a second end) is for striking the drum.

FIG. 3 shows a prior art approach with a wooden mallet shaft which has been tapered more narrowly toward the core end of the stick. This does have the effect of altering the center of mass and moving it further toward the player end, but only by a very small amount. Moreover, the narrowness of the wooden shaft exacerbates the problem of shaft vibration. These wooden mallets are notoriously prone to excessive vibration, and become uncomfortable to use for extended periods of time. Also, due to the material properties of the wood, the lower end mass limit of the design is constrained by the fact that the stick will become too weak and break.

FIG. 4 shows a design common with many German timpani mallets—a rubber grip on the shaft at the player's end. This also does have the effect of altering the center of mass and moving it further toward the player end, but again only by a very small amount. Moreover, the problem is amplified with this German stick design, since these shafts are frequently narrower and lighter mass than the shaft shown in FIG. 3, but the German cores and wraps are often heavier. This means that the center of mass is inherently much closer to the core-end of the mallet, requiring much greater compensation to balance it toward the player-end. Another detriment is that many players dislike the feeling of a rubber grip on the shaft. It interferes with the way the mallet could naturally fit in the hand and is not compatible with the hand grip used by certain schools of timpani playing.

FIG. 5 shows yet a third design, somewhat similar in concept to FIG. 4. In this design, there is a foam-rubber padded grip on the player end and a moveable mass that can slide along the length of the shaft. While having merit, this fails to solve problems in several basic ways. For example, as mentioned above, the introduction of a foam hand grip is not desirable for reasons of grip utility. Also, the moveable mass is very light itself, and unable to dramatically alter the balance. Moreover, the moveable mass cannot move far enough toward the player-end to back-weight the mallet. Still further, since the moveable mass can mainly travel from the midpoint up to the core-end, it's primary effect is to make the mallet more front-heavy, exactly the opposite of the solution one is usually looking for. Finally, the moveable mass is inconsistent and problematic, in that it is very difficult to lock it in place, and it can slide around at will during performance, unintentionally altering the tone in undesirable ways.

Prior US patent documents related to percussion and/or timpani mallets include U.S. Pat. Nos. 1,739,275; 2,521,336; 3,146,659; 3,147,660; 3,422,719; 3,585,897; 3,665,799; 3,958,485; 3,998,123; 4,047,460; 4,114,503; 4,202,241; 4,300,438; 4,307,647; 4,632,006; 4,649,792; 4,905,566; 5,218,152; 5,602,355; 6,307,138; 6,653,541; 6,759,583; 7,439,434; 7,538,264; 7,626,108; 7,868,237; 7,906,719; 8,163,989; 8,981,194; 8,987,569; 9,626,943; 2004/0231493; and 2011/0166820.

SUMMARY

Embodiments described herein including mallets, devices, and tools for percussion instrumentation, as well as methods of making such mallets, devices, and tools, and methods of using such mallets, devices, and tools.

A first aspect provides for a timpani percussion mallet for use with a timpani musical instrument by a timpani player, the mallet comprising:

a shaft having a first end that is for a timpani player to hold, and also having an opposite second end that is for the timpani player striking a part of the timpani musical instrument, wherein the shaft comprises at least one tube with outer walls, wherein the tube contains within the outer walls a plurality of segments including a first segment comprising a first solid segment material and a second segment comprising a second solid segment material different from the first solid segment material, and optional additional segments with optional additional solid segment materials, wherein the first and second segments are each non-movable within the tube, wherein the first segment is located closer to the first end, and the second segment is located closer to the second end, wherein the first segment and the second segment have different densities to provide the timpani percussion mallet and the shaft with a controlled density gradient to control center of mass, moment of inertia, and/or vibration mitigation for the timpani percussion mallet.

In one embodiment, the plurality of segments which are contained within the outer walls of the tube entirely fill the tube. In one embodiment, the first segment and the second segment contact each other. In one embodiment, the tube contains within the outer walls at least three segments, including at least one third segment comprising a third solid segment material, and the third segment is disposed between the first and second segments. In one embodiment, the tube contains within the outer walls at least three segments, including at least one third segment comprising a third solid segment material, and the third segment is disposed between the first and second segments, and the third segment has a density which is different from and intermediate to the densities of the first and second segments. In one embodiment, the tube contains within the outer walls at least four segments, including at least one third segment comprising a third solid segment material, and at least one fourth segment comprising a fourth solid segment material, and the third and fourth segments are disposed between the first and second segments and the third and fourth segments each have a density which is intermediate to the densities of the first and second segments. In one embodiment, the controlled gradient density is a radially nested gradient density. In one embodiment, the first end and the second end of the shaft comprise open ends of the tube. In one embodiment, the first end and the second end of the shaft comprise open ends of the tube, and the first segment extends to the opening of the first end, and the second segment extends to the opening of the second end. In one embodiment, the first solid segment material includes at least one cured material component, and the second solid segment material also includes at least one cured material component. In one embodiment, the first solid segment material comprises at least one first polymer component, and the second solid segment material comprises at least one second polymer component different from the first polymer component. In one embodiment, the first solid segment material comprises at least one foam component, and the second solid segment material comprises at least one caulking material component. In one embodiment, at least one of the segments comprises at least two material components within the segment. In one embodiment, the tube is a carbon fiber tube. In one embodiment, the shaft is linear and characterized by an elongation dimension z which provides for a shaft length, and also characterized by a shaft diameter which are used in a mathematical calculation to provide for a desired controlled density gradient. In one embodiment, the mallet is characterized by a center of mass which disposed toward the first end. In one embodiment, the mallet is characterized by a center of mass which disposed toward the second end. In one embodiment, the mallet has an overall mass of more than 50 grams.

In one embodiment, the mallet is characterized by a shaft length of 300 mm to 440 mm, and wherein the mallet is characterized by a shaft diameter of 6 mm to 19 mm, and wherein the tube outer wall thickness is 0.64 mm to 1.52 mm, the mallet further comprising a core and a wrap disposed at the second end of the mallet. In one embodiment, the tube is a carbon fiber tube, the first solid segment material comprises a polymer foam component, and the second solid segment material comprises a caulking material component, and wherein the plurality of segments which are contained within the outer walls of the tube entirely fill the tube.

A second aspect provides for a timpani percussion mallet comprising a shaft comprising a single tube with a first end and a second end and also with outer walls and, contained within the outer walls, a plurality of segments including a first segment having a first density and made of a first solid segment material, and also a second segment different from the first having a second density different from the first density and made of a second solid segment material, wherein the first and second segments are each non-movable within the tube.

In one embodiment, at least one of the segments comprises at least two material components which provide for a radially nested gradient density. In one embodiment, the tube contains within the outer walls at least three segments, including at least one third segment comprising a third solid segment material, and the third segment is disposed between the first and second segments. In one embodiment, the tube contains within the outer walls at least three segments, including at least one third segment comprising a third solid segment material, and the third segment is disposed between the first and second segments and the third segment has a density which is intermediate to the densities of the first and second segments. In one embodiment, the plurality of segments which are contained within the outer walls of the tube entirely fill the tube. In one embodiment, the first end and the second end of the tube are open ends. In one embodiment, the first end and the second end of the tube are open ends, and the first segment extends to the opening of the first end, and the second segment extends to the opening of the second end. In one embodiment, the tube is a carbon fiber tube. In one embodiment, the first solid segment material comprises at least one foam component, and the second solid segment material comprises at least one caulking material component. In one embodiment, the tube is a carbon fiber tube, the first solid segment material comprises a polymer foam component, and the second solid segment material comprises a caulking material component, and wherein the first end and the second end of the tube are open ends, and the first segment extends to the opening of the first end, and the second segment extends to the opening of the second end.

A third aspect provides for a timpani percussion mallet comprising a shaft comprising a single tube with a first end and with a second end, and also with outer walls and, contained within the outer walls, at least one segment having a density and made of at least one solid segment material, wherein the at least one segment is non-movable within the tube, wherein the first end and the second end of the tube are open ends. In one embodiment, contained within the outer walls is only the one segment having a density and made of a solid segment material. In one embodiment, contained within the outer walls is only the one segment having a density and made of a solid segment material which entirely fills the tube. In one embodiment, contained within the outer walls is only the one segment having a density and made of a solid segment material, and the solid segment material comprises at least one polymer. In one embodiment, contained within the outer walls is only the one segment having a density and made of a solid segment material, and the solid segment material comprises at least one cured material. In one embodiment, contained within the outer walls is only the one segment having a density and made of a solid segment material, and the solid segment material comprises at least one foam. In one embodiment, contained within the outer walls is only the one segment having a density and made of a solid segment material, and the first solid segment material is a sprayable foam. In one embodiment, the tube is a carbon fiber tube. In one embodiment, the mallet is characterized by a shaft length of 300 mm to 440 mm, and wherein the mallet is characterized by a shaft diameter of 6 mm to 19 mm, and wherein the tube outer wall thickness is 0.64 mm to 1.52 mm. In one embodiment, the mallet further comprising a core and a wrap disposed at one end of the mallet.

Another aspect is a method of making the mallets as described and/or claimed herein, wherein the method comprises the steps of providing a tube as an open tube and inserting the first segment material and any additional segment materials into the open tube. In one embodiment, a dowel plunger is used to fill the tube with the segment material and control the position and length of the segment material in the tube, wherein the dowel plunger has a diameter which matches the diameter of the inner diameter of the hollow shaft. In one embodiment, a dowel plunger is used to fill the tube with segment material and control the position and length of the segment material in the tube, wherein the dowel plunger has a diameter which matches the diameter of the inner diameter of the hollow shaft, and further a sacrificial layer is used at the end of the dowel plunger. In one embodiment, the mallet is further subjected to at least one cure step to cure one or more segment materials within the tube.

In one embodiment, the mallet is further subjected to at least one cure step to cure one or more segment materials within the tube, wherein the cure is carried out without the application of external heat. In one embodiment, the mallet is further subjected to at least one cure step to cure one or more segment materials within the tube, wherein the cure is carried out with the application of external heat. In one embodiment, the mallet is further subjected to at least one cure step to cure one or more segment materials within the tube, wherein the cure is carried out with the application of UV light.

Another aspect includes a method of using the mallets as described and/or claimed herein, wherein the player strikes a timpani percussion instrument with the mallet. In one embodiment, the player strikes a timpani percussion instrument with a pair of the mallets as described and/or claimed herein.

At least one advantage can result from the one or more aspects and/or embodiments described herein, including, for example:

(i) Controlled density gradient to tailor mallet balance (center of mass) to help maintain a good sound at different masses, thus enabling good sounds with broad sustain tone characteristics;

(ii) Widest possible range of mallet masses, creating widest possible range of sustain tones;

(iii) Mitigates shaft vibration;

(iv) Balance-tailoring generally can solve the problems associated with front-heavy mallets;

(v) Balance-tailoring specifically enables higher mass sticks so that they do not produce too hard of an attack with undesirable overtones;

(vi) Balance-tailoring and shaft-filling specifically enables mallets that can sound good on slack drum heads;

(vii) Shaft-filling specifically enables lower mass sticks so that they don't manifest undesirable shaft vibration;

(viii) Balance-tailoring creates sticks that can perform much better timpani rolls; and (ix) Balance-tailoring creates sticks with much more favorable moment of inertia that feel "better in the hand" and are more "playable" for the player of the musical instrument.

Other advantages and combinations of advantages are evident throughout this description.

BRIEF DESCRIPTION OF THE FIGURES

FIG. 9 illustrates a center of mass calculation for the embodiment shown in FIG. 8. A pseudo-continuous density gradient can be calculated modeling this as series of slices (e.g., 1,000 slices). A truly continuous gradient would be achieved as 1000 approaches ∞.

FIG. 10 illustrates an embodiment for radial nested filling in which a fill material with a density $\rho_4$ can be nested inside fill material number three.

DETAILED DESCRIPTION

Introduction

Figure 1:
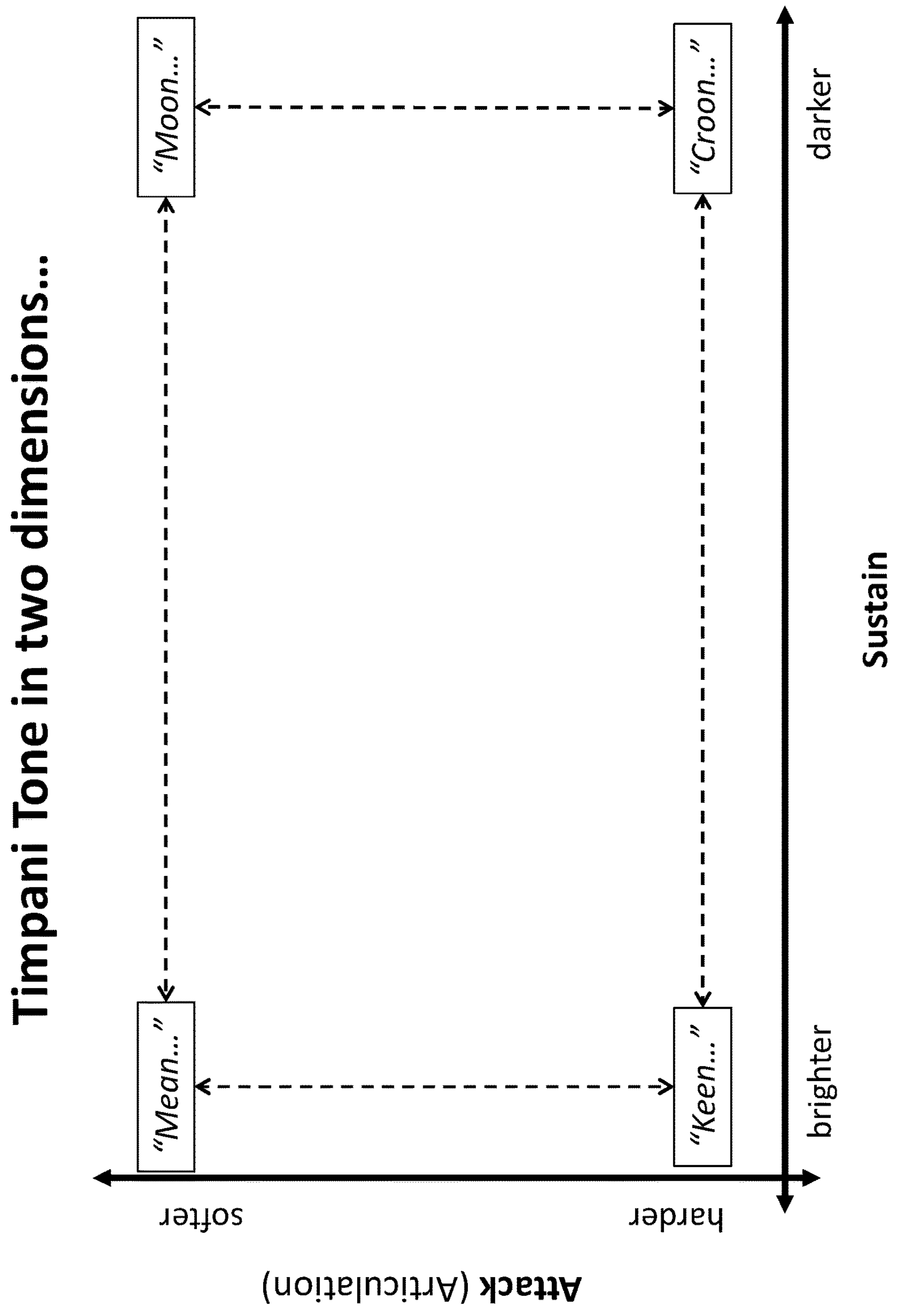
FIG. 1 illustrates the two dimensional analysis of timpani tone.
Figure 2:
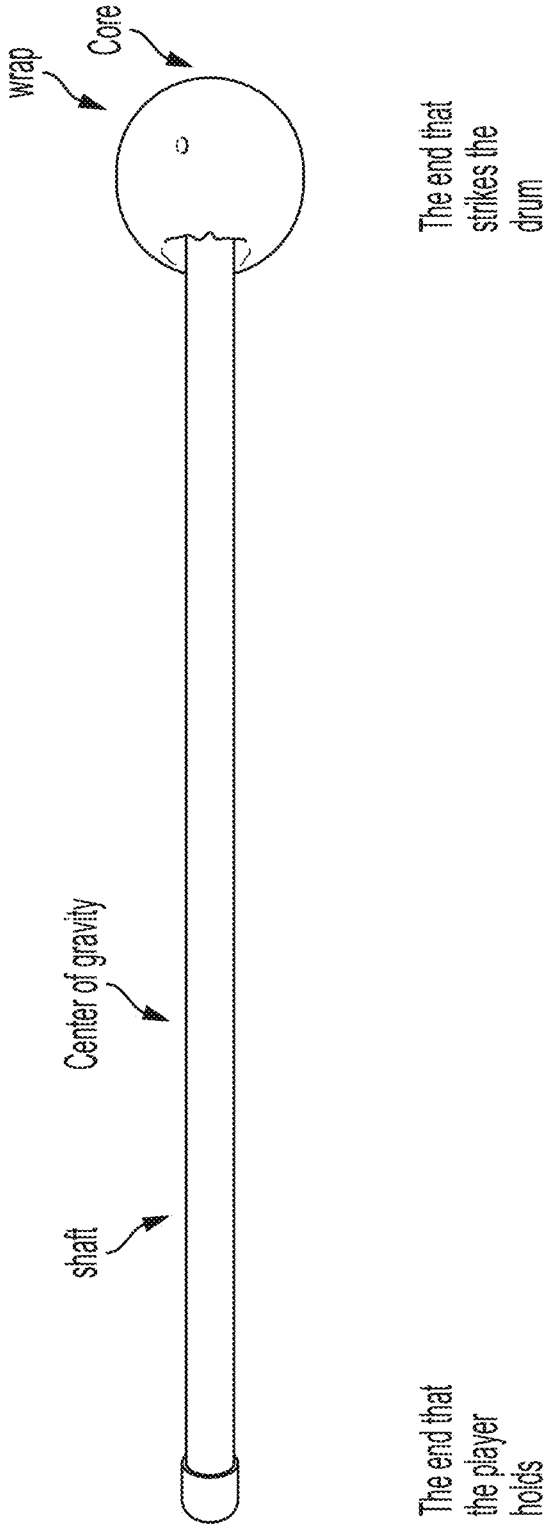
FIG. 2 illustrates a typically timpani mallet anatomy in the prior art, showing a shaft, a core, and a wrap, wherein one end is held by the player and the other end is for striking the drum. A center of mass is also shown.
Figure 3:
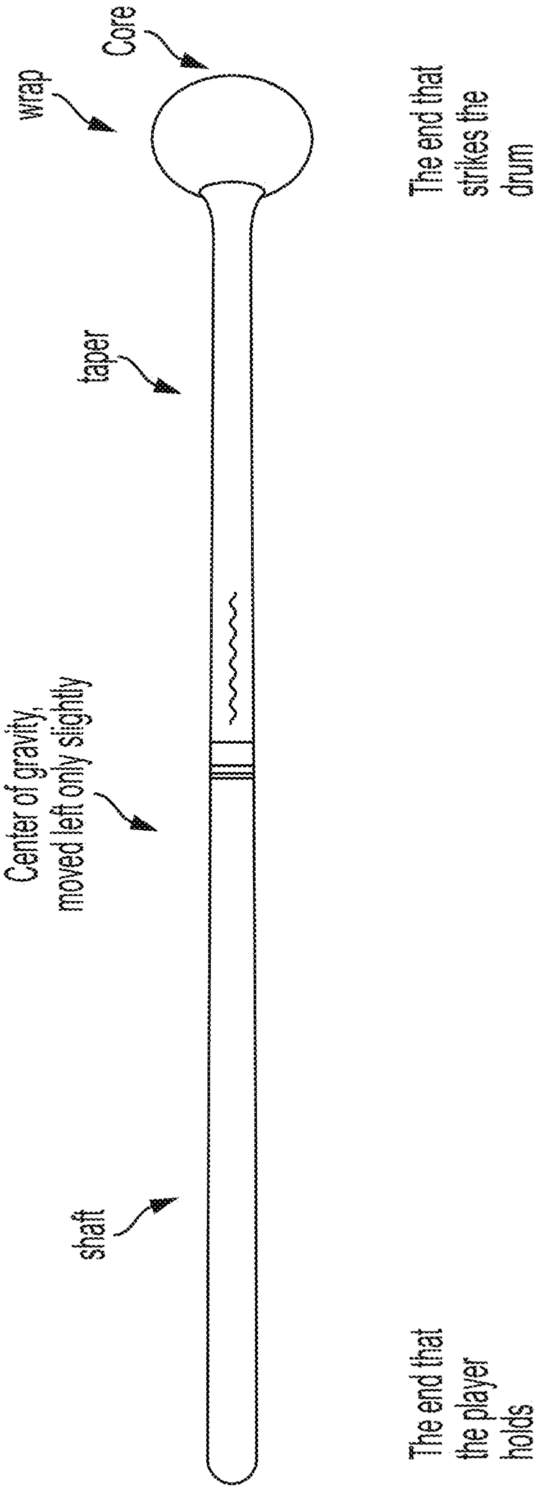
FIG. 3 illustrates a prior art approach with a wooden mallet shaft which has been tapered more narrowly toward the core end of the stick.
Figure 4:
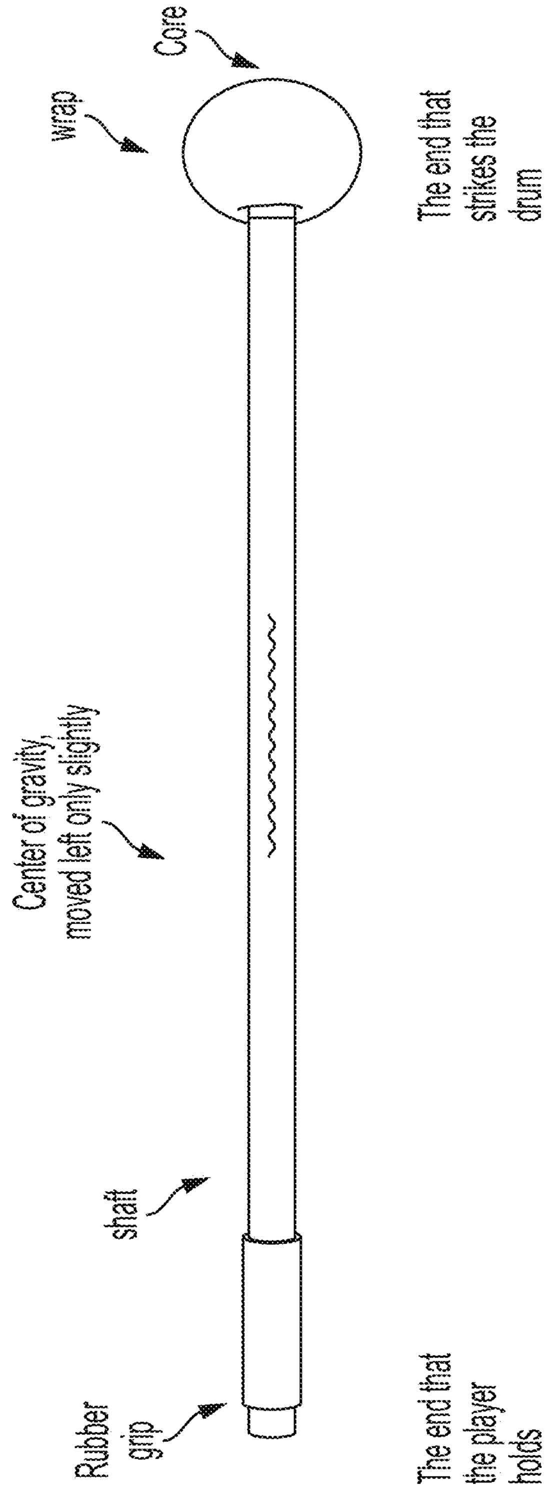
FIG. 4 illustrates a second prior art approach using a rubber grip on the shaft at the player's end.
Figure 5:
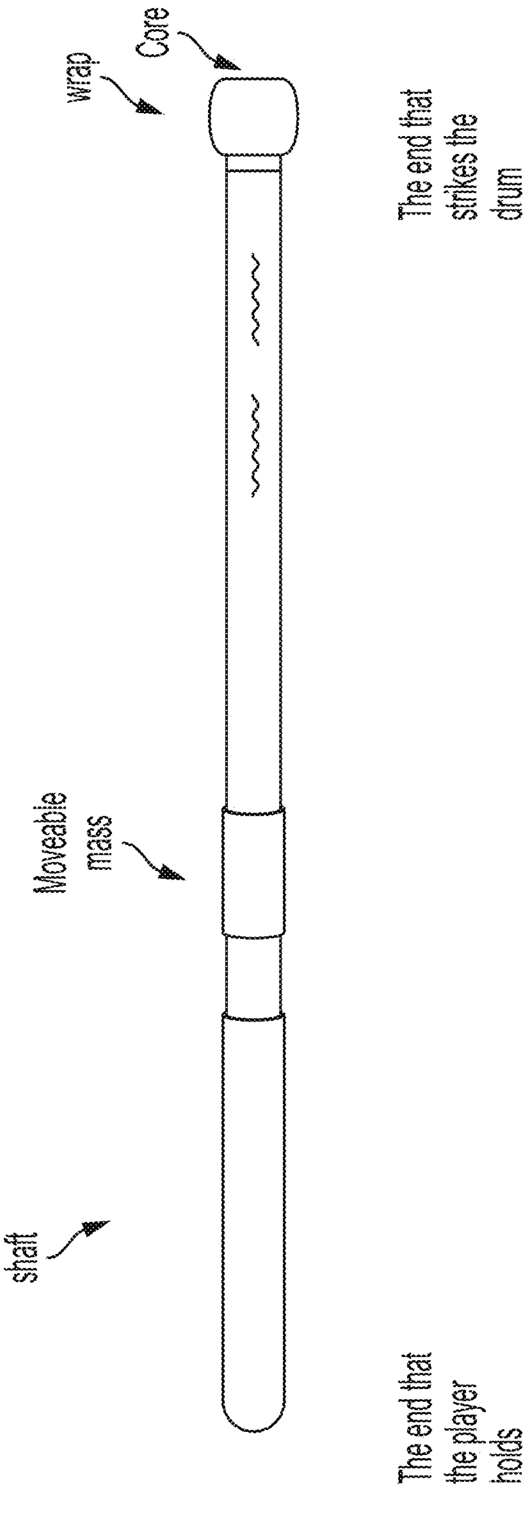
FIG. 5 shows a third prior art approach in which a foam-rubber padded grip on the player end and a moveable mass that can slide along the length of the shaft.

Priority U.S. provisional application Ser. No. 62/525,573 filed Jun. 27, 2017 is hereby incorporated by reference in its entirety for all purposes.

All references cited herein are incorporated by reference in the entirety and for all purposes. Various examples of percussion instruments and mallets are described in, for example, U.S. Pat. Nos. 1,739,275; 2,521,336; 3,146,659; 3,147,660; 3,422,719; 3,585,897; 3,665,799; 3,958,485; 3,998,123; 4,047,460; 4,114,503; 4,202,241; 4,300,438; 4,307,647; 4,632,006; 4,649,792; 4,905,566; 5,218,152; 5,602,355; 6,307,138; 6,653,541; 6,759,583; 7,439,434; 7,538,264; 7,626,108; 7,868,237; 7,906,719; 8,163,989; 8,981,194; 8,987569; 9,626,943; 2004/0231493; and 2011/0166820.

For embodiments which are described and/or claimed with the open terms "comprising" or "comprises," the embodiments also can be described and/or claimed with these open terms being replaced by partially closed or closed terms such as "consisting essentially of" or "consists essentially of" or "consists of," or "consisting of."

Detailed description is provided hereinafter for a first aspect which provides for a timpani percussion mallet for use with a timpani musical instrument by a timpani player, the mallet comprising: a shaft having a first end that is for a timpani player to hold, and also having an opposite second end that is for the timpani player striking a part of the timpani musical instrument, wherein the shaft comprises at least one tube with outer walls, wherein the tube contains within the outer walls a plurality of segments including a first segment comprising a first solid segment material and a second segment comprising a second solid segment material different from the first solid segment material, and optional additional segments with optional additional solid segment materials, wherein the first and second segments are each non-movable within the tube, wherein the first segment is located closer to the first end, and the second segment is located closer to the second end, wherein the first segment and the second segment have different densities to provide the timpani percussion mallet and the shaft with a controlled density gradient to control center of mass, moment of inertia, and/or vibration mitigation for the timpani percussion mallet.

Detailed description is also provided for a second aspect which is a timpani percussion mallet comprising a shaft comprising a single tube with a first end and a second end and also with outer walls and, contained within the outer walls, a plurality of segments including a first segment having a first density and made of a first solid segment material, and also a second segment different from the first having a second density different from the first density and made of a second solid segment material, wherein the first and second segments are each non-movable within the tube.

A third aspect is also provided with more detailed description below.

Percussion, mallets, and percussion mallets are generally known in the art including timpani percussion mallets. The different components of a mallet are known including the shaft or the elongated shaft, a core and a wrap disposed at the second end of the mallet, and if needed a grip component at the first end of the mallet. The mallet can also include identification labeling and also color or decorative aspects. Mallets can be fabricated and used in pairs as known in the art.

The shaft of the timpani mallet can be shaped as desired including it can be straight or it can be tapered.

If desired, a plug or cover can be used to cover up the otherwise open end of the tube of the shaft.

Timpani mallets can be finished if desired. The finish can be a natural finish or a lacquer, for example.

Examples of mallets and sticks for percussion instruments include timpani mallets (which is the main focus of this invention), multi-percussion mallets (e.g., torn toms, wood blocks, and the like), keyboard mallets (e.g., xylophone, glockenspiel), vibraphone mallets, marimba mallets, bass drum mallets, cymbal mallets, and snare drum sticks.

Musical instruments including percussion instruments are generally known in the art. Timpani drums and timpani drum heads are a preferred embodiment. More generally, a preferred embodiment for the presently claimed inventions is generally any "membranophone" where the head has a non-trivial decay time. i.e., it rings. The preference is mainly for timpani but could also be bass drum.

Players for musical instruments and using percussion mallets are known in the art, but elite players who need to win highly competitive auditions are particularly a focus of the presently claimed inventions. These more advanced artists have a particular need for a wide range of expressive, sustain tones. Humans can play the instrument, although in principle the player can be a robotic player.

Controlled Gradient Density

The density gradient for the inventive timpani percussion mallet is a "controlled density gradient." This controlled density gradient does not result from an unintended or accidental design of the percussion mallet. Rather, the controlled density gradient is designed to improve the performance of the musical instrument in one or more ways related to the controlled density gradient found in the timpani percussion mallet. Mathematical calculations or computer computation can be used to design the mallet with controlled density gradient. The improvements with intentional control and design can be measured by objective testing such as sound equipment and frequency or spectrum analyzers, and/or it can be measured by interviewing the players of the musical instrument after use of the timpani percussion mallet. In particular, the controlled density gradient provides for control of center of mass, moment of inertia, and/or vibration mitigation for the timpani percussion mallet. One skilled in the art can design the timpani percussion mallet to find the desired balance of these and other performance parameters which can be adapted to a particular timpani drum and musical context. In some cases, center of mass will be most important, but in other cases, the moment of inertia can be most important. Also, vibration mitigation can be the primary problem solved. In addition, the overall mass of the shaft and the mallet is a very important factor to be controlled and integrated with the controlled density gradient. The overall mass impacts and is very important for the sustain aspect of the tone and should be controlled. A wide range of masses can provide an excellent palette of sounds (see FIGS. 21A and 21B, for example). The overall mass can be, for example, 15 g to 80 g, or greater than 50 g, or 50 g to 80 g, or less than 35 g, or 15-35 g. Particular challenges can arise in making higher mass mallets which have excellent sound.

Figure 6:
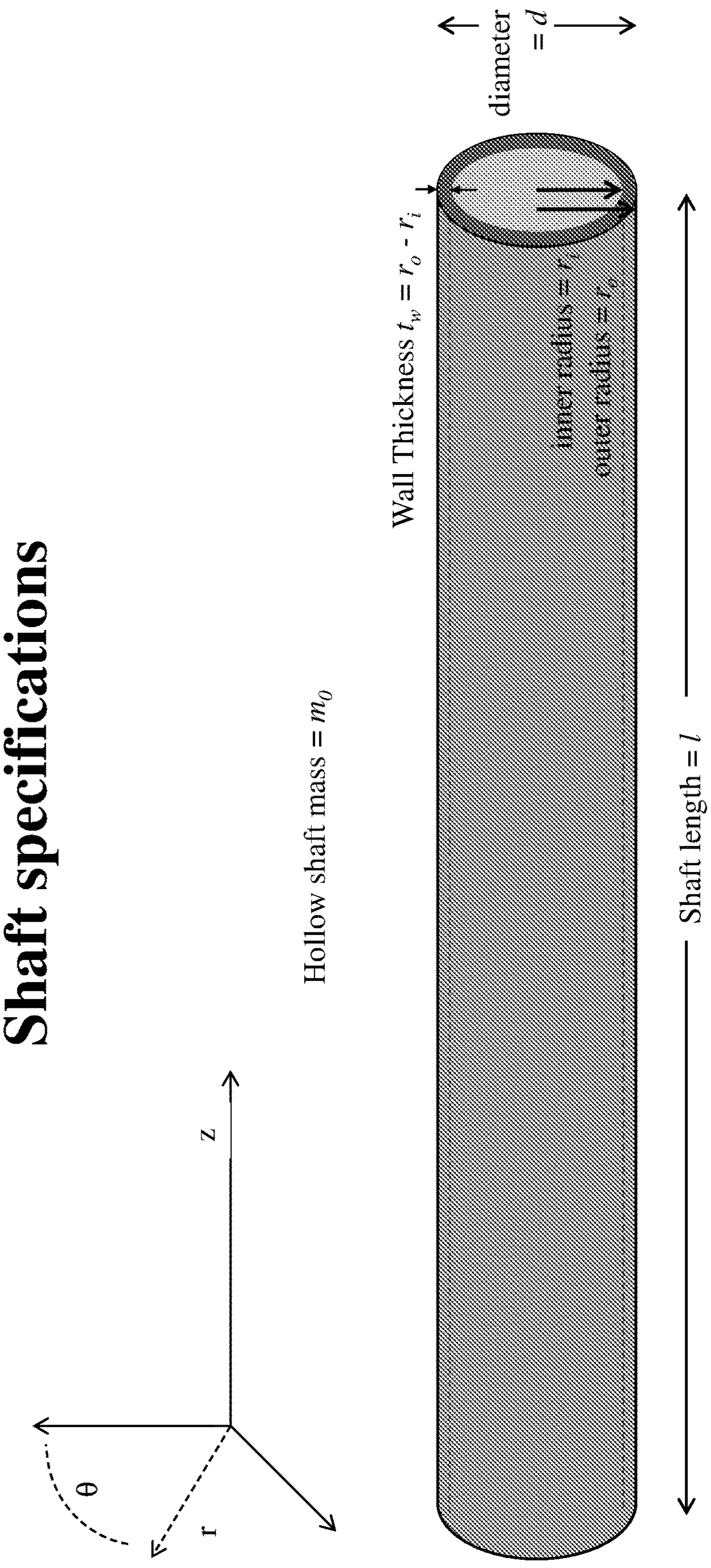
FIG. 6 shows an example of shaft specifications for a hollow tube, useful for describing embodiments of the claimed inventions, showing r, direction z, and angle θ, as well as wall thickness ($t_w$), diameter (d), inner radius ($r_i$), outer radius ($r_o$), and shaft length (l).

FIG. 6 shows a starting point for a framework for use in describing the controlled density gradient and other elements of the claimed invention in an embodiment in which the shaft includes a tube with outer walls. FIG. 6 shows such a theoretical hollow shaft of length l, diameter d, radii $r_i$ and $r_o$, for inner radius and outer radius (respectively), wall thickness $t_w$, and mass $m_0$. One assumes a 3D coordinate system as shown, where z runs along the axis of the shaft, r extends out radially from the center point of the shaft, and θ describes the position around the circumference of the shaft. For many purposes, the designs and concepts can be assumed to be θ-symmetric. The basic design of FIG. 6 can be applied to many embodiments for the percussion mallets including carbon fiber shaft timpani mallets and also most bamboo shaft mallets. Nearly all bamboo plants have a hollow core, though their inner radii $r_i$ are highly variable and inconsistent. If there are variations in the tube (e.g., diameter), one can if desired use an average parameter (e.g., average diameter). Nevertheless, one embodiment includes bamboo mallets despite variations which can be present. Computer modeling can be used to design the mallet.

Figure 7:
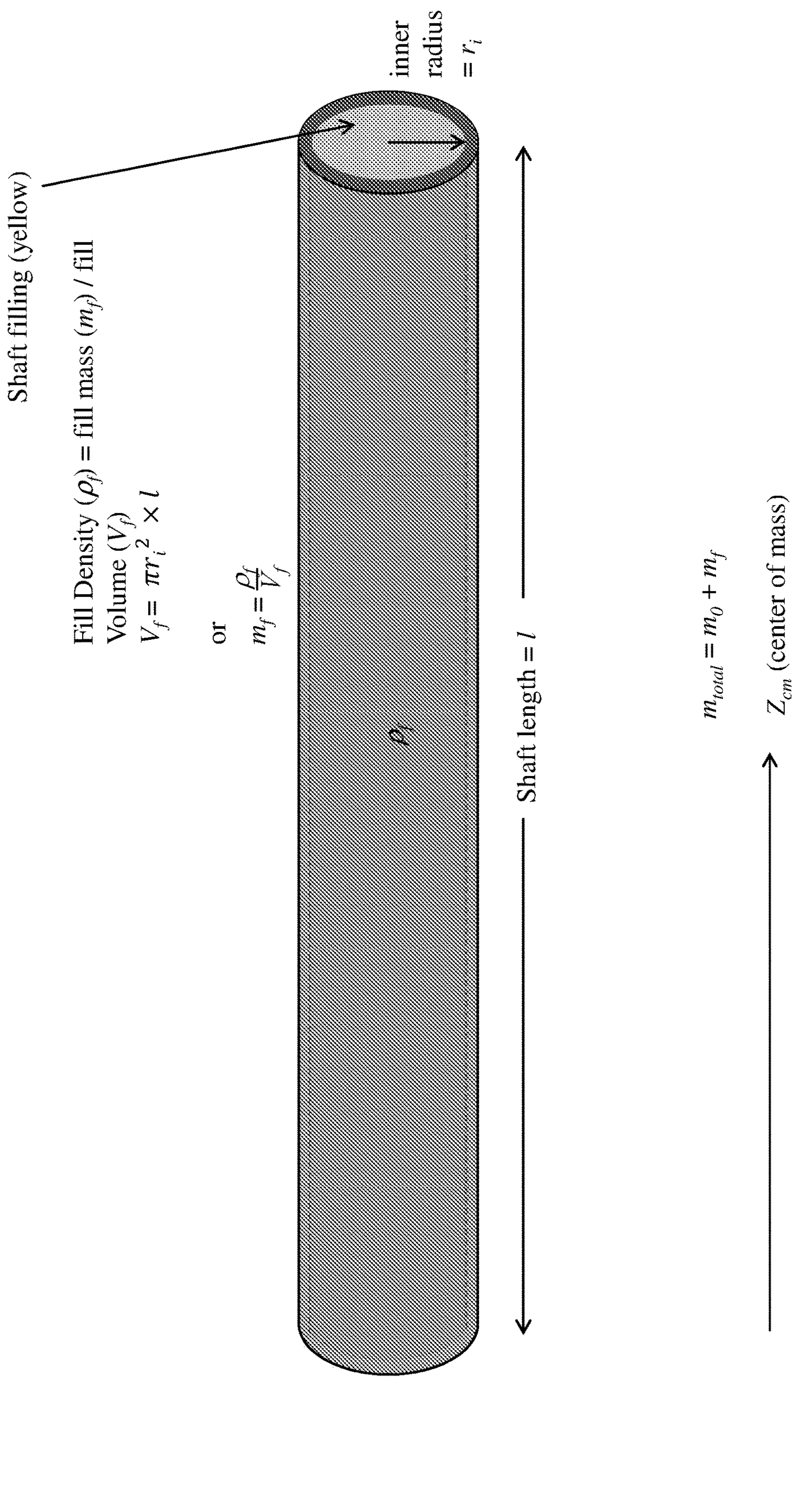
FIG. 7 shows an embodiment for uniform shaft filling of the hollow tube for the embodiment shown in FIG. 6 with one fill material.

As shown in FIG. 7, the hollow inside of the shaft (i.e., space within the outer walls) can be filled with material of some density $\rho_f$. The filled material can be called a segment such as a first segment. In most cases, the length of the fill can be assumed to be the length of the full shaft l. In most cases, the diameter of the fill can be assumed to be $2r_i$. The material properties of the fill material should at least be suited to mitigate shaft vibration. Many materials can provide this "dampening effect," either by absorbing or reflecting the initial mechanical impulse so that it is not transmitted along the length of the shaft to the player's hand.

In FIG. 7, the shaft fill will increase the net mass by $m_f$, resulting in a total mass $m_{total}=m_0+m_f$. In this scenario, the center of mass of the whole body remains at the exact midpoint, $Z_{cm}=l/2$.

Figure 8:
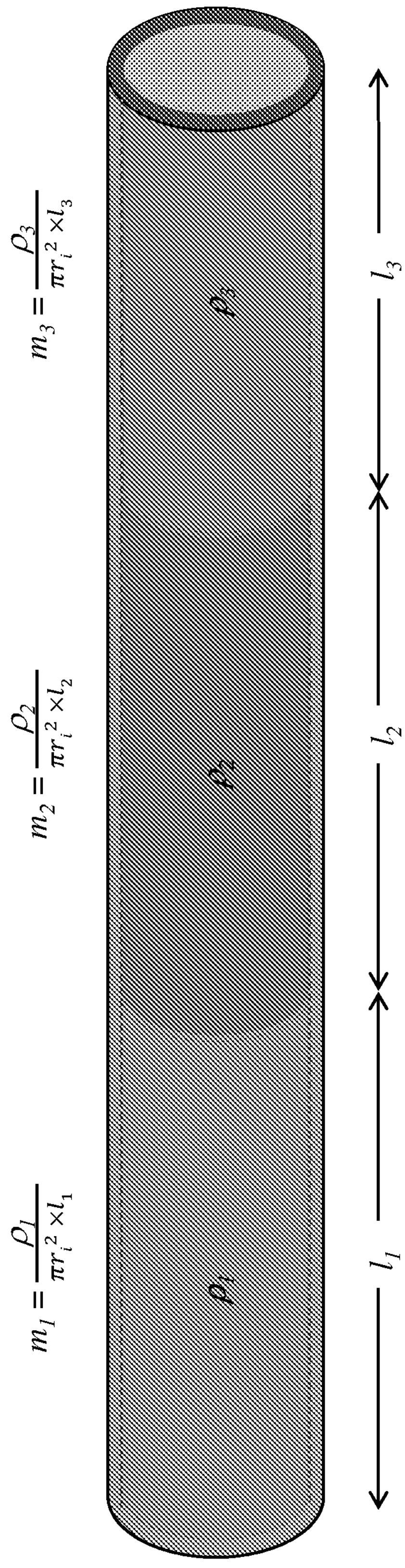
FIG. 8 shows an embodiment for a gradient density shaft filling of the hollow tube in a non-continuous manner for the embodiment shown in FIG. 6, showing three segments designated as $\rho_1$, $\rho_2$, and $\rho_3$.
Figure 11:
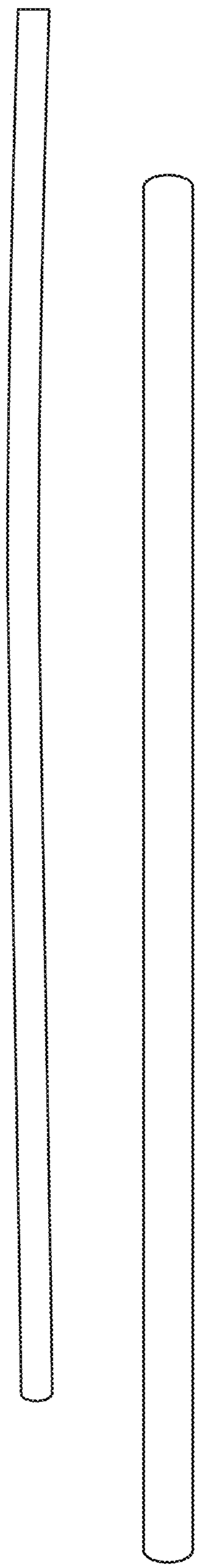
FIG. 11 illustrates in a top view a hollow carbon fiber tube (lower; darker color) and a wooden dowel (upper; lighter color) which can be used to insert into the tube to fabricate the shaft of the mallet with one or more segment materials.
Figure 12:
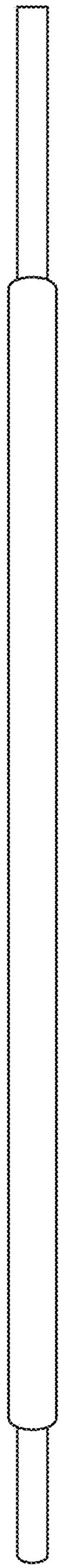
FIG. 12 illustrates in a top view how the dowel and tube of FIG. 11 can be used so that the dowel is longer than and fully inserted into the tube and movable in the tube (with dowel extending out of both ends of tube).
Figure 13:
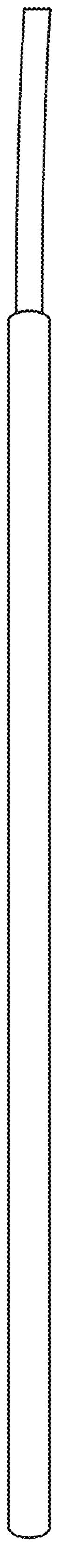
FIG. 13 illustrates in a top view how the dowel and tube of FIG. 11 can be used so that the dowel is only partially inserted into the tube.
Figure 14:
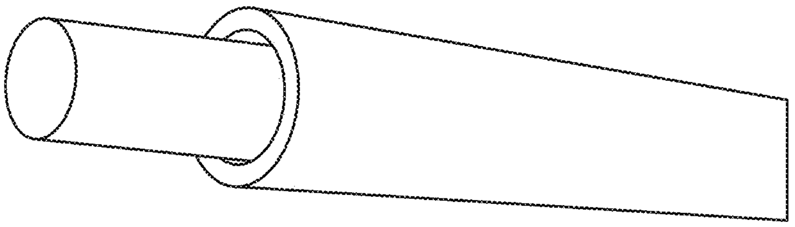
FIG. 14 illustrates in a perspective view how the dowel and tube of FIG. 11 can be used so that the dowel is extending out of the tube, noting that the diameter of the dowel is almost the same as the inner diameter of the tube.
Figure 15:
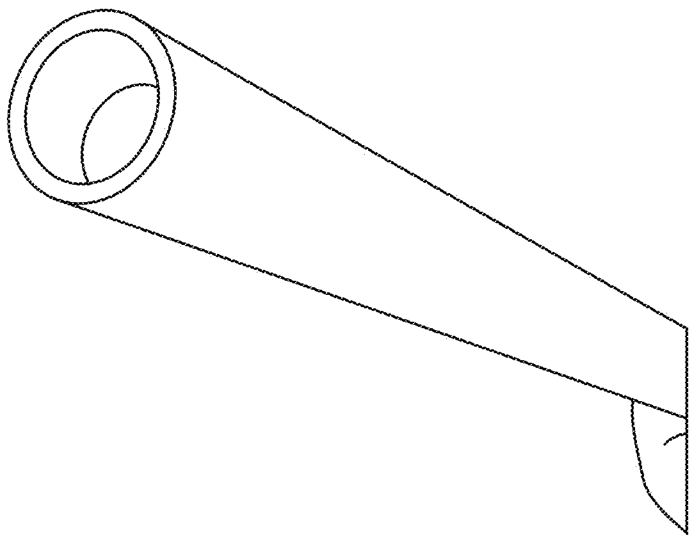
FIG. 15 illustrates how the dowel and tube of FIG. 11 can be used so that the dowel is only partially inserted into the tube and leaves room for filling with one or more segment materials.

In addition to mitigation of vibration, a second key component is tailoring the balance of the timpani mallet with use of a controlled density gradient. This can be accomplished by varying the density $\rho_f$ of the fills as shown in FIG. 8 (in one embodiment, showing three segments for filling the tube) according to $\rho_1$, $\rho_2$, $\rho_3$, of differing lengths $l_1$, $l_2$, $l_3$, and with differing masses $m_1$, $m_2$, $m_3$. (Note: three fills are used as an example in FIG. 8, but the only limits are between 1 and ∞, where ∞ represents a smooth continuous gradient.) This consequently changes the center of mass according to FIG. 9, where the new $Z_{cm}$ is determined by a composite of the various new masses $m_1$, $m_2$, $m_3$. The valid assumption here is that each fill component of length l can be treated as a point mass at its center, where the coordinate is expressed as $z=l/2$. Therefore, in order to predictably tailor the center of mass (i.e., mallet balance), all one needs to know is the density of the fill material (a readily available material property) and then control the different fill lengths ($l_1$, $l_2$, $l_3$) during fabrication. The control of fill lengths can happen in a variety of ways including the ways described in the working examples hereinafter.

In one embodiment, the shaft is linear and characterized by an elongation dimension z which provides for a shaft length, and also characterized by a shaft diameter which are used in a mathematical calculation to provide for a desired controlled density gradient.

In one embodiment, the mallet is characterized by a center of mass which is disposed toward the first end. In another embodiment, the mallet is characterized by a center of mass which disposed toward the second end. One of the primary problems to be solved in the prior art is that most mallets are unable to achieve a center of mass disposed toward the first end (i.e., the end that the player holds).

In some cases, it can be desirable to have one or more nested fills as illustrated in, for example, FIG. 10. For example it may be desirable for a certain material of density $\rho_4$ to be surrounded, insulated, cladded, or secured by a different material of density $\rho_3$. In this case, the material of density $\rho_4$ and diameter $2r_4$ is assumed to be embedded in a radially symmetric fashion (although this is not strictly necessary), and is assumed to match the length such that $l_4=l_3$ (although this is not strictly necessary either). The composite mass $m_{34}$ is calculated as shown, with the new center of mass $Z_{cm}$ changing as shown.

The "nested fill" embodiment, therefore, also produces a density gradient along the r-axis, where as the number of "nests" approaches ∞ we achieve a continuous density gradient along r. So the fullest theoretical version of the "density gradient" invention is a tailorable gradient along the z-axis and a tailorable gradient along the r-axis. A gradient along the 8-axis could be possible, but likely undesirable.

The properties of the various materials (i.e., #1, #2, #3, and #4) can be chosen for maximum performance benefit as described elsewhere herein.

Hence, in one embodiment, the controlled gradient density is a radially nested gradient density.

Shaft

The shaft or elongated shaft body is generally known in the art for timpani percussion mallets. It is generally linear. The shaft can comprise an outer tube with outer walls and one or materials can be added inside the tube to provide for segments as described herein. The tube can have two open ends which allow for filling of the tube. The shaft can be straight with constant diameter or it can be tapered.

First End of Shaft

The first end of the shaft is adapted to be held by the player, typically with use of the player's hand. For example, grips such as rubber grips can be added to the outside of the first end of the shaft, as known in the art. In addition, one can have a physical index (like a heat shrink for example) can be a beneficial way to keep the hands aligned in the Z direction on the mallet shaft or two mallet shafts.

Second End of Shaft

The second end of the shaft is adapted to be used for striking the musical instrument. As known in the art, core and wraps can be used to further engineer the contact of the mallet with the instrument such as a drum head. The added weight of components like core and wrap on the second end of the shaft can create the need to balance more weight to the first end of the shaft.

First and Second Segments of Shaft

The shaft can comprise a plurality of segments including at least one first segment and at least one second segment. The segments can be disposed within the outer walls of the tube of the shaft. Additional optional segments can be present including a third, fourth, fifth segment, and the like. There is no particular upper limit to the number of segments. Two, three, four, or five and higher segments in the shaft can be the same or different.

The segments including the first and second segments can contact each other. Or they can be spaced apart although spacing apart often is not desired.

The first and second segments are continuous and can contact each other and are adapted to be non-movable within the tube as the mallet is being used.

First and Second Materials

A variety of materials can be used in the first and second segments (and additional segments if desired). Generally, they are solid materials. A material can comprise a single component or more than one component (i.e., multi-component materials such as mixtures of components can be used to form a first material or a second material; for example two polymers can be mixed or a metal object can be embedded into a polymeric matrix to form a two component material). The materials are used such that they can be inserted or injected into a tube. For example, sprayable or expanding materials can be used such as sprayable foam or expanding foam. Acoustic foams are known in the art.

The material of the segment can be, for example, solid material such as, for example, a cured material, a polymeric material, a foam material, a caulk material (including a silicone caulk material), a metal such as stainless steel, and the like.

In one embodiment, the first segment material includes at least one cured material component, and the second segment material also includes at least one cured material component.

Curing or hardening can be important. Using one way or another, one needs to get materials inside the tube which will partially or totally fill the volume, and then become a permanent part of the shaft and not be movable within the shaft. A continuous segment of material can form within the tube and be non-movable. Non-movability is important to ensure that no extraneous sounds are created, and/or that no extraneous vibrations are introduced to the shaft. Thus, foam and/or caulk materials that are semi-liquids that later cure or harden are desirable.

In one embodiment, the first segment material comprises at least one first polymer component, and the second segment material comprises at least one second polymer component different from the first polymer component.

In one embodiment, the first segment material comprises at least one foam component, and the second segment material comprises at least one caulking material component.

In one embodiment, at least one of the segments comprises at least two material components within the segment. For example, the segment can include a polymer and also a metal material component such as stainless steel. The metal can be a cylinder which is roughly centered in the tube and has polymer encasing the cylinder.

Materials with Different Densities

Each material of the different segments can be characterized by a density which is different from the other segments. This allows for a controlled density gradient. The designer of the mallet and shaft can control the densities and the order of the different segments to achieve the particular goal of the mallet.

A wide range of densities can be used for the first, second, and other segments. For example, the great stuff foam (in a 0.5 inch diameter tube) has a linear density of 0.070 grams per inch, whereas stainless steel has a linear density of 14.180 grams per inch—i.e., 203 times more dense. In some embodiments, therefore, the ratio of densities between materials of the segments can be at least five, or at least ten, or at least 20, or at least 50, or at least 100, or at least 200. An upper limit for this ratio of densities can be, for example, 250 or 500.

Tube/Outer Wall Embodiment

In the preferred embodiment, the shaft or elongated shaft body of the percussion mallet comprises at least one tube with outer walls, wherein the tube contains within the outer walls the first solid segment material and the second solid segment material to provide for the controlled density gradient. Such a structure can be achieved by first providing the tube with outer walls with one or two open ends and then filling the tube with materials to provide for the first segment and the segment comprising the first segment material and the second segment material contained within the outer walls.

The filling of the tube with outer walls of the shaft of the percussion mallet with any solid material helps mitigate problems of a vibrating shaft body. This filling using a controlled density gradient allows one to intentionally control balance, center of mass, and/or moment of inertia.

In one embodiment, the plurality of segments which are contained within the outer walls of the tube entirely fill the tube.

In one embodiment, the tube contains within the outer walls at least three segments, including at least one third segment comprising a third solid segment material, and the third segment is disposed between the first and second segments.

In one embodiment, the third segment has a density which is different from and intermediate to the densities of the first and second segments.

In one embodiment, the tube contains within the outer walls at least four segments, including at least one third segment comprising a third solid segment material, and at least one fourth solid segment comprising a fourth segment material, and the third and fourth segments are disposed between the first and second segments and the third and fourth segments have a density which is intermediate to the densities of the first and second segments, and, optionally, the densities of the each segment becomes less as the segment is disposed further away from the end of the elongated shaft. Preferably, the densities of each segment presumably consistently rise or fall as you move across the shaft. For example, the density of the first segment at one end of the shaft is the lowest density, and each additional segment as one moves along the shaft to the other end has a higher density, which the second segment at the other end being the highest density segment.

In one preferred embodiment, the highest density is not at the very end of the player side. For example, one can have a segment with a steel rod which provides the heaviest segment, but this is placed in the interior and is not at the end. For example, a steel-rod-nested design can have the steel slug about 1.5 inches into the shaft. So from the player end (the first end), the order of segments can be (for example): 1.5 inches caulk, 1.0 inches steel and caulk, 2.5 inches caulk, and 10" great stuff foam, extending to the second end (total length, 15 inches).

In one embodiment, the first end and the second end of the shaft are open ends. In one embodiment, the first segment extends to the opening of the first end, and the second segment extends to the opening of the second end.

By open tube or an open end of the tube, it is meant that the shaft ends where the tube ends. The tube can be filled or unfilled and still be an open end. An open end does not include situations where the outer walls of the tube merge and form a closed end. For example, if a solid tube is drilled into from one side only half the length of the tube, the solid tube now after drilling has one open end but a second non-open or closed end. The open ended tube which provides the end of the shaft can be capped with a cover or core but still be open ended, as the cap or cover is not part of the shaft or tube. The open end nature of the tube also refers to the tube being open ended during fabrication. Typically, the player end of the mallet, shaft, and tube can include a covering for decorative, non-functional purposes. The drum side of the mallet, shaft, and tube can be covered with functional elements such as the core and wrap.

In one embodiment, the tube (and outer wall of the tube) is made of carbon fiber, wood, bamboo, rattan, metal, and/or plastic (or other polymers and/or resins). In a preferred embodiment, the tube (and outer wall of the tube) is a carbon fiber tube.

Dimensions

In one embodiment, the mallet is characterized by a shaft length of, for example, 300 mm to 440 mm, or 330 to 406 mm.

In one embodiment, the mallet is characterized by a shaft diameter of 6 mm to 19 mm, or 9.5 mm to 16 mm. This can be the diameter of a non-tapered shaft.

In one embodiment, the mallet is characterized such that the tube outer wall thickness is 0.64 mm to 1.52 mm.

Methods of Making Timpani Percussion Mallets

Other embodiments include the methods of making the mallets and the shafts of the mallets are described and/or claimed herein. For example, the method can comprise the steps of providing a tube as an open tube and inserting the first segment material and any additional segment materials into the open tube. During insertion or filling steps, the segment materials can be in a precursor form. The precursor form can be later cured to a final form when in the tube.

In one embodiment, a dowel plunger is used to fill the tube with the segment material and control the position and length of the segment material in the tube, wherein the dowel plunger has a diameter which matches the diameter of the inner diameter of the hollow shaft. In matching, of course, the dowel plunger must be of a size to allow it to be inserted into the tube, so it may be slightly less in diameter to allow this. However, preferably, the match is as close as possible.

In another embodiment, a dowel plunger is used to fill the tube with segment material and control the position and length of the segment material in the tube, wherein the dowel plunger has a diameter which matches the diameter of the inner diameter of the hollow shaft, and further a sacrificial layer is used at the end of the dowel plunger. The optionally thin and optionally low-mass sacrificial layer can be beneficial to ensure that the dowel plunger does not, for example, become bonded with segment material during curing.

In one embodiment, the mallet is further subjected to one or more cure steps to cure one or more segment materials within the tube. In one embodiment, a first cure is done to cure a first segment material, and a second cure is done to cure a second segment material (in either order). In one embodiment, the mallet is further subjected to a cure step to cure one or more segment materials within the tube, wherein the cure is carried out without the application of external heat. In one embodiment, the mallet is further subjected to a cure step to cure one or more segment materials within the tube, wherein the cure is carried out with the application of external heat. In another embodiment, the mallet is further subjected to a cure step to cure one or more segment materials within the tube, wherein the cure is carried out with the application of UV light.

Figure 24:
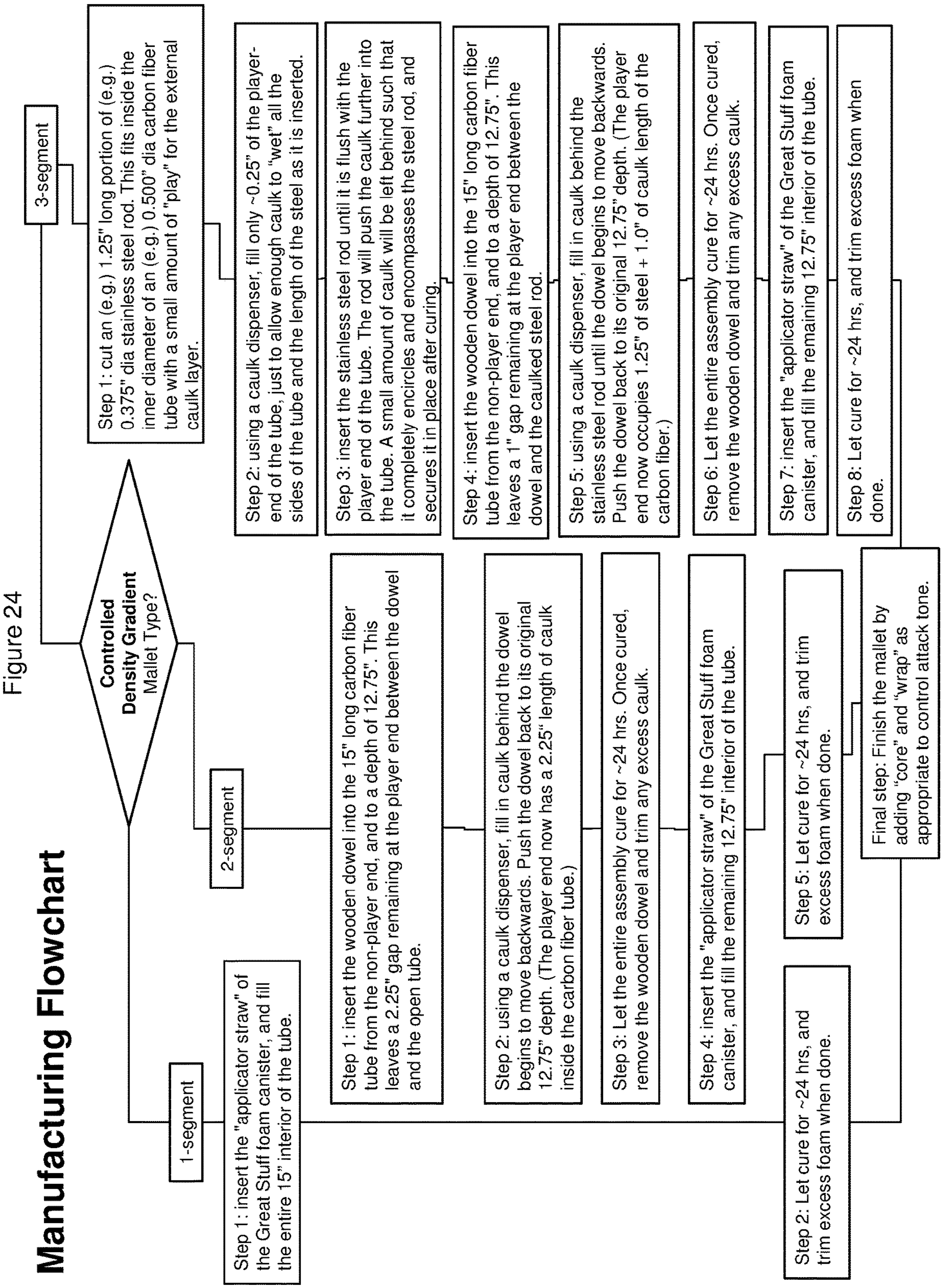
FIG. 24 shows a flow chart for three working examples for fabrication methods for timpani percussion mallets.

FIG. 24 shows a flow chart for representative methods of making timpani mallets (see also working examples), but other embodiments not shown in FIG. 24 also can be used.

PREFERRED EMBODIMENTS

Examples of preferred embodiments are further described including with use of mathematical calculations to illustrate how one controls the design of the timpani percussion mallet.

In one preferred embodiment, the tube is a carbon fiber tube, the first solid segment material comprises a polymer foam component, and the second solid segment material comprises a caulking material component, and wherein the plurality of segments which are contained within the outer walls of the tube entirely fill the tube.

In another preferred embodiment, the tube is a carbon fiber tube, the first solid segment material comprises a polymer foam component, and the second solid segment material comprises a caulking material component, and wherein the first end and the second end of the tube are open ends, and the first segment extends to the opening of the first end, and the second segment extends to the opening of the second end.

A preferred shaft material for the outer tube is carbon fiber, which can be acquired from, for example, Avia sport composites/Goodwinds, pultruded carbon tubes. Carbon fiber is preferable to the alternatives for many of the reasons cited above and below (e.g., consistent mass, density, length, diameter, wall thickness, and the like). Nearly all other known materials are inferior in this respect. For example, bamboo tubes can be very inconsistent batch to batch, density-wise, size, shape, knots, and the like. Wood tubes can be fickle too in terms of density and Young's modulus. Two carbon fiber examples include:

(i) A 15.0" long 0.500" diameter pultruded carbon fiber tube has $m_{0.500}$=22.82 grams.

(ii) A 15.5" long 0.625" diameter pultruded carbon fiber tube has $m_{0.625}$=40.00 grams.

For a full length single-material shaft fill, (see, for example, the third aspect) a preferred fill material is great stuff sprayable foam. This material is extremely light weight (low density), but expands to fill the area, and its cured resin matrix is extremely effective at mitigating shaft vibration. For this preferred material, its linear density (ρl) is the mass per given length assuming a fixed radius.

(i) For the 0.500" diameter shaft, $\rho l_{foam0.5}$=0.070 g/inch.

(ii) For the 0.625" diameter shaft, $\rho l_{foam0.625}$=0.090 g/inch.

In the situation of FIG. 7, the total masses change very little with the addition of the vibration mitigating sprayable foam.

(i) For 15.0" long 0.500" diameter shaft, $m_{total,0.5}=m_{0.500}+0.07\times 15$=23.87 grams (4.6% increase compared to the unfilled tube).

(ii) For 15.5" long 0.625" diameter shaft, $m_{total,0.625}=m_{0.625}+0.09\times 15.5$=41.40 grams (3.5% increase compared to the unfilled tube).

In the situation of FIG. 8, balance tailoring is preferentially achieved by introducing a second material—e.g., clear silicone caulk. Commercially available silicone caulks have remarkably consistent linear density characteristics.

(i) For the 0.500" diameter shaft, $\rho l_{caulk0.500}$=2.260 g/inch.

(ii) For the 0.625" diameter shaft, $\rho_{caulk0.625}$=3.530 g/inch.

In the situation of FIG. 8, the total masses now change dramatically with the addition of the caulk. In terms of determining the overall effect on balance, it should be clarified that a $Z_{cm}$ specified in inches is fairly unhelpful, since mallets have varying lengths. What is more important is the proportional balance—i.e., relative to its entire length, what percentage further back or forward resides the $Z_{cm}$? This is easily calculated as bal-%=$Z_{cm}/l$, where a higher percentage indicates a center of mass further away from the player (usually undesirable).

For example, for a 15.0" long 0.500" diameter shaft filled completely with great stuff foam, $Z_{cm}$=7.5", and bal-%=7.5/15=50%. (For now, this is neglecting the later added mass of the core and felt.)

However, suppose one adds 4" of caulk to the player-side (the first end), with 11" of foam remaining in the rest of the shaft. In this case, it follows:

$l_{foam}$=11"

$l_{caulk}$=4"

$m_{foam}$=11"×0.070 g/inch=0.77 g $m_{caulk}$=4"×2.260 g/inch=9.04 g $z_{foam}$=4+11/2=9.5"

$z_{caulk}$=4/2=2"

And so $Z_{cm}$ is found as:

$$Z_{cm} = \frac{m_{foam}z_{foam} + m_{caulk}z_{caulk}}{m_{foam} + m_{caulk}} = \frac{0.77\cdot 9.5 + 9.04\cdot 2}{0.77 + 9.04} = 2.59''$$

And thus bal-%=2.59/15=17.3%. This is a much more preferentially back-weighted mallet shaft, and represents a unique process for precisely tailoring or "dialing in" the center of mass of a mallet. This step is unique for making sticks that consistently "feel good." (Again, with the addition of a core, the center of mass will obviously move back closer to the center, but this exercise serves to illustrate the method of implementing the theory for controlling the center of mass.) Also, note in this calculation that one can neglect the carbon fiber shaft, since it is constant throughout the length. For any final mallet mass calculation, however, one can account for its native mass.

WORKING EXAMPLES

Additional embodiments are also provided by the following non-limiting working examples.

Example One: Construction of a Timpani Percussion Mallet with Controlled Density Gradient FIGS. 11-17 illustrate construction of an embodiment for the inventive timpani construction mallet with a controlled density gradient using a first segment and a second segment only.

In this working example, the tube is made of carbon fiber and has a total diameter of 0.5 inches, a length of 15 inches, a wall thickness of 0.053 inches, and an inner diameter of 0.394 inches. The first segment material was foam and the second segment material was caulking material.

FIGS. 11-17 shows how the fabrication steps above can be accomplished. Since the foam is expanding and self-filling but the caulk is not, the caulking was inserted into the tube before the foam. A wooden dowel "plunger" of diameter matching the inner diameter of the hollow shaft works well for this. (i.e., inner diameter=full diameter−$2t_w$.) The plunger just needs to be inserted the exact length the foam will eventually occupy, in this instance 11". See FIGS. 11-15 for using the tube and dowel.

Since the caulk has an adhesive quality, in can be helpful to include a "sacrificial layer" at the end of the dowel-plunger, like a piece of tissue or toilet paper—something that will stick to the caulk and allow the dowel to be freely removed after the caulk is cured. At that point, the caulk was injected in the opposite end up until it hits the dowel. This can be seen as the dowel moves, and it is helpful to use a sharpie to mark the reference point on the dowel. Often, the dowel will be pushed short of its reference point; this is desirable, as you can then just push it back to the reference point. In so doing, excess caulk will spill out the other end. That is desirable too, since after curing it can be trimmed flush with the end of the shaft with a razor. Achieving extremely consistent deposition of caulk is very important here, as it can dramatically affect the final mass and balance if it is just a few percentage points off. The final step is taping the dowel in place so that it doesn't shift during curing of the caulk inside the tube. Full curing takes, for example, 12-24 hours.

Upon removing the dowel, filling the remaining inner volume of the tube of the shaft with foam can be carried out. Cans of sprayable foams are known. The sprayable can comes with a "straw applicator," allowing one to get the "spray point" deep inside the empty part of the mallet shaft. If one begins spraying slowly, it will first spray up against the cured "wall" of the caulk, and then begin to slowly back fill. One can "follow it out" as it backfills, slowly pulling the applicator straw further and further out of the shaft until the entire shaft is full. Excess foam will continue to expand out of the end of the shaft as it cures. This is desirable, since after curing it can be easily trimmed flush with the end of the shaft with a razor. Full curing of the foam inside the tube takes, for example, 12-24 hours.

In sum, in step one, the higher density caulk is first inserted in the tube and cured, and the length of the insertion (length of the fill) is controlled with use of the dowel plunger. In step two, the dowel plunger is removed and then lower density fill is added. The fill material is self-expanding as it cures and fills up all of the remaining gap space.

Figure 16:
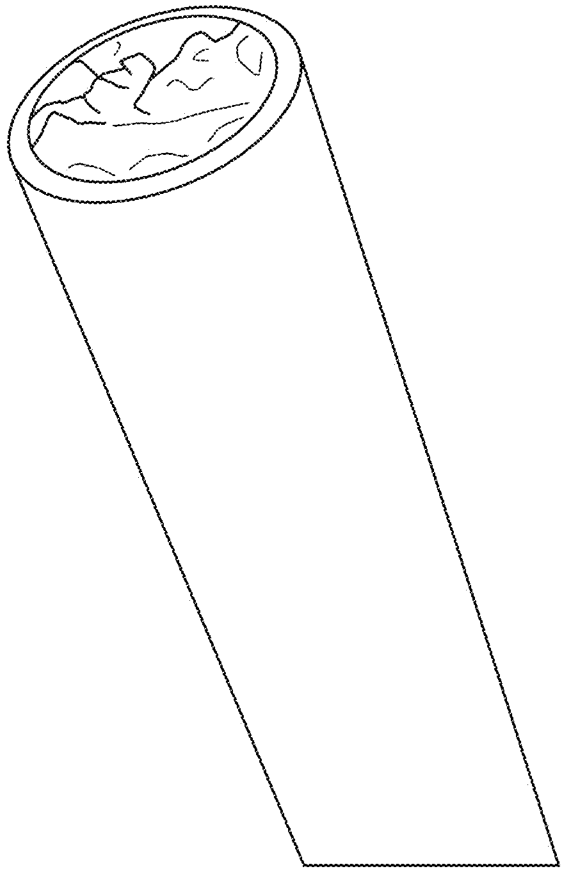
FIG. 16 illustrates a perspective view showing a mallet with a tube comprising a caulk segment and a foam segment, and showing the one end with the foam segment extending to the end of the tube which is an open tube (normally the drum side of the tube).
Figure 17:
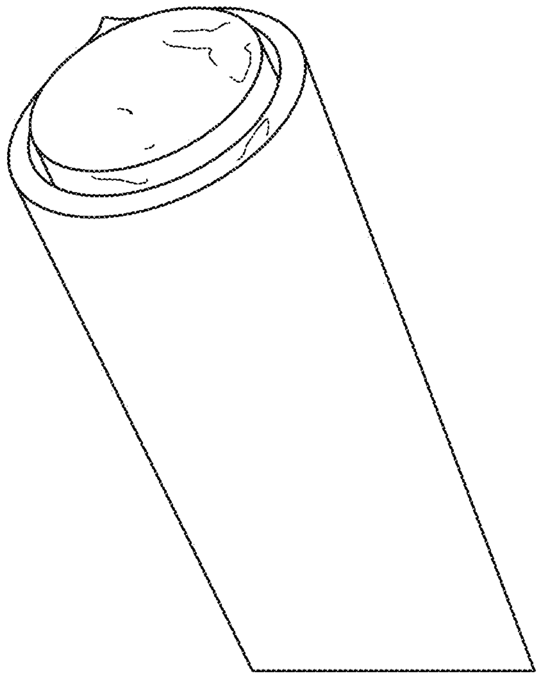
FIG. 17 also illustrates, as in FIG. 16, a perspective view showing a mallet with a tube comprising a caulk segment and a foam segment, and showing the other end with the caulk segment extending to the end of the tube which is an open tube (normally the player side of the tube).

At this point, a balance-tailored shaft has been achieved. The overall construction of the two ends is shown in FIGS. 16-17.

Example Two: Stainless Steel Embodiment for Segment

Figure 18:
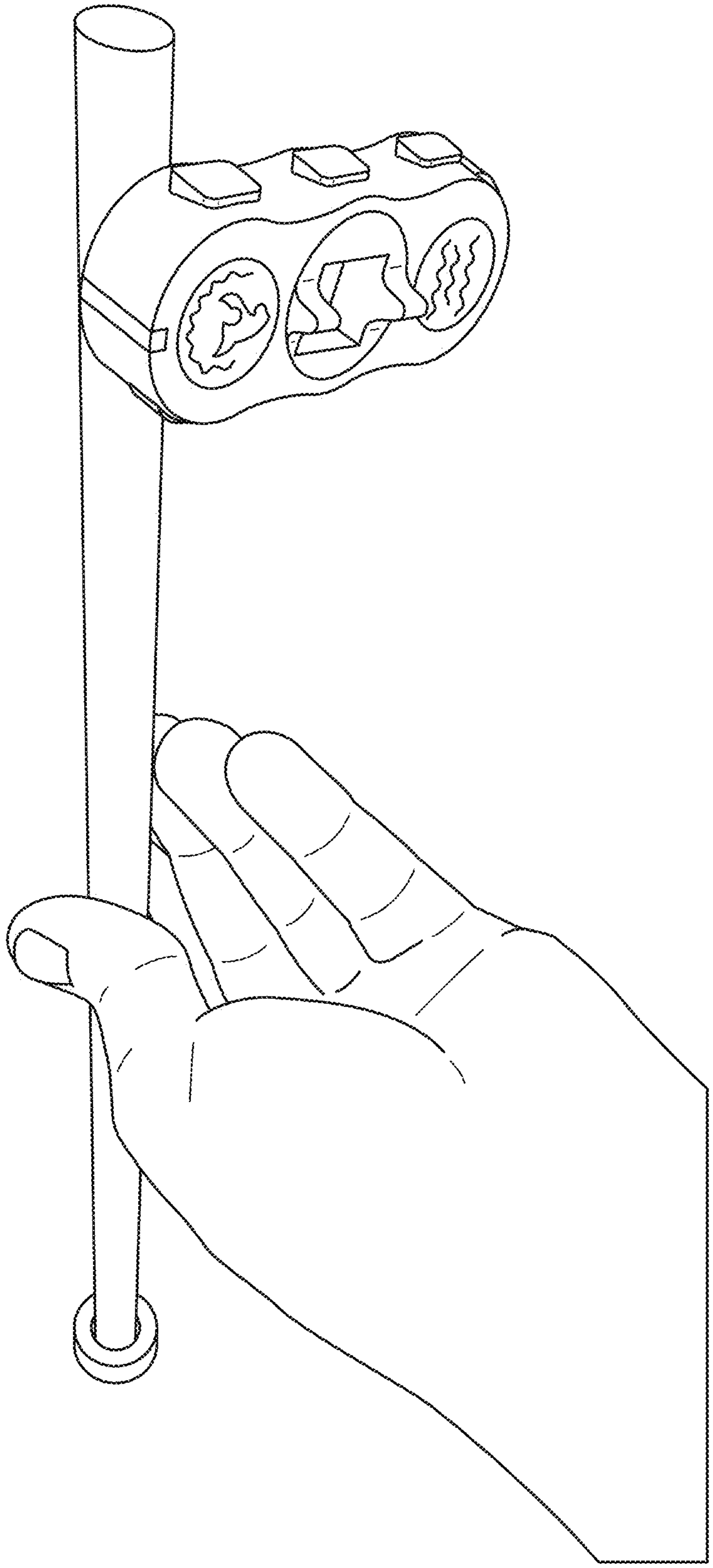
FIG. 18 illustrates a mallet with shaft made with (starting from player's end): 1 inch of caulk, a 1.5 inch long stainless steel rod (0.375 inch diameter) nested inside a thin layer of caulk as per ρ3 and ρ4 of FIG. 10, and finally 12.5 inches of great stuff foam. The stainless steel is magnetizable, as shown by a magnetic stud finder hanging from the shaft in mid-air.
Figure 19:
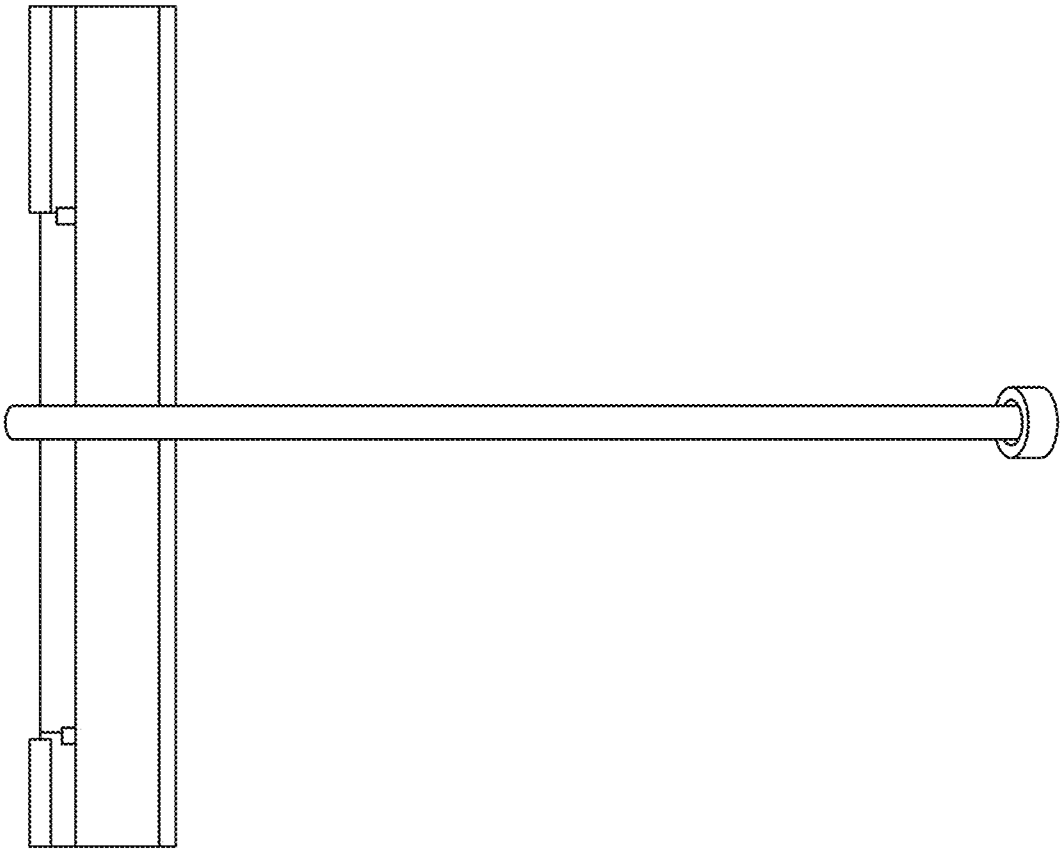
FIG. 19 illustrates the mallet of FIG. 18 which also can hang from a magnetic kitchen knife rack.
Figure 20:
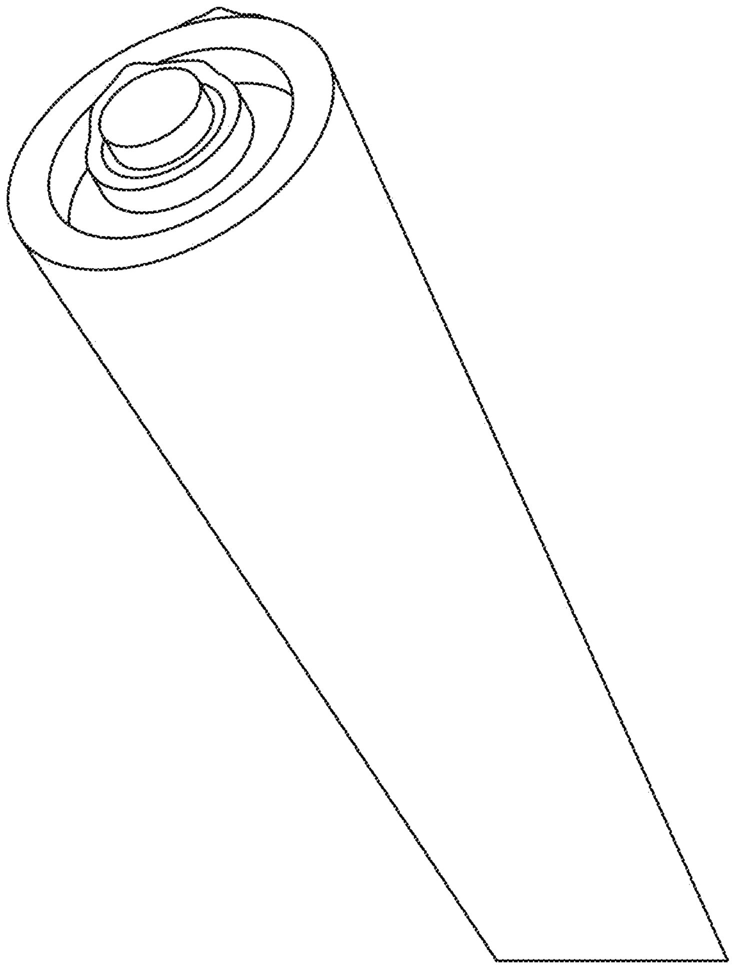
FIG. 20 illustrates with a perspective view a variation of FIGS. 18 and 19 with use of a 0.625 inch diameter shaft with a machine screw embedded in the caulk which fills the tube.

In FIGS. 18-20, another embodiment is shown in which a metal, stainless steel, is inserted into the tube. Other metals and materials can be used for insertion.

Other embodiments of the balance-tailored shaft have included high density materials inserted with radial symmetry into the caulk segment as it cures, including: nails, screws, stainless steel rods, and aluminum rods, to name a few. In some embodiments, the rods' diameters have been nearly as large as the inner diameter of the carbon fiber tube, thus producing a preferential "snug fit" which is then held in place on all sides by a thin layer of caulking. A heavily "back-weighted" mallet was achieved with high-mass high-density lengths of stainless steel inserted into the caulking. Nominal linear densities of stainless steel inserts for a 0.500" diameter carbon fiber tube measured as high as 15.41 g/inch. By contrast, aluminum rods measured a linear density of 4.91 g/inch. (Compare this to the linear density of caulk: 2.26 g/inch.) In some embodiments, the fact that certain grades of stainless steel (i.e., 400 series) are magnetically permeable (i.e., magnetizeable) can be desirable, as it may be useful for storing, hanging, transporting, or otherwise dealing with the mallets in the same way as kitchen knives on a magnetic strip.

Performance and Two Dimensional Analysis of Timpani Mallets

Figure 21A:
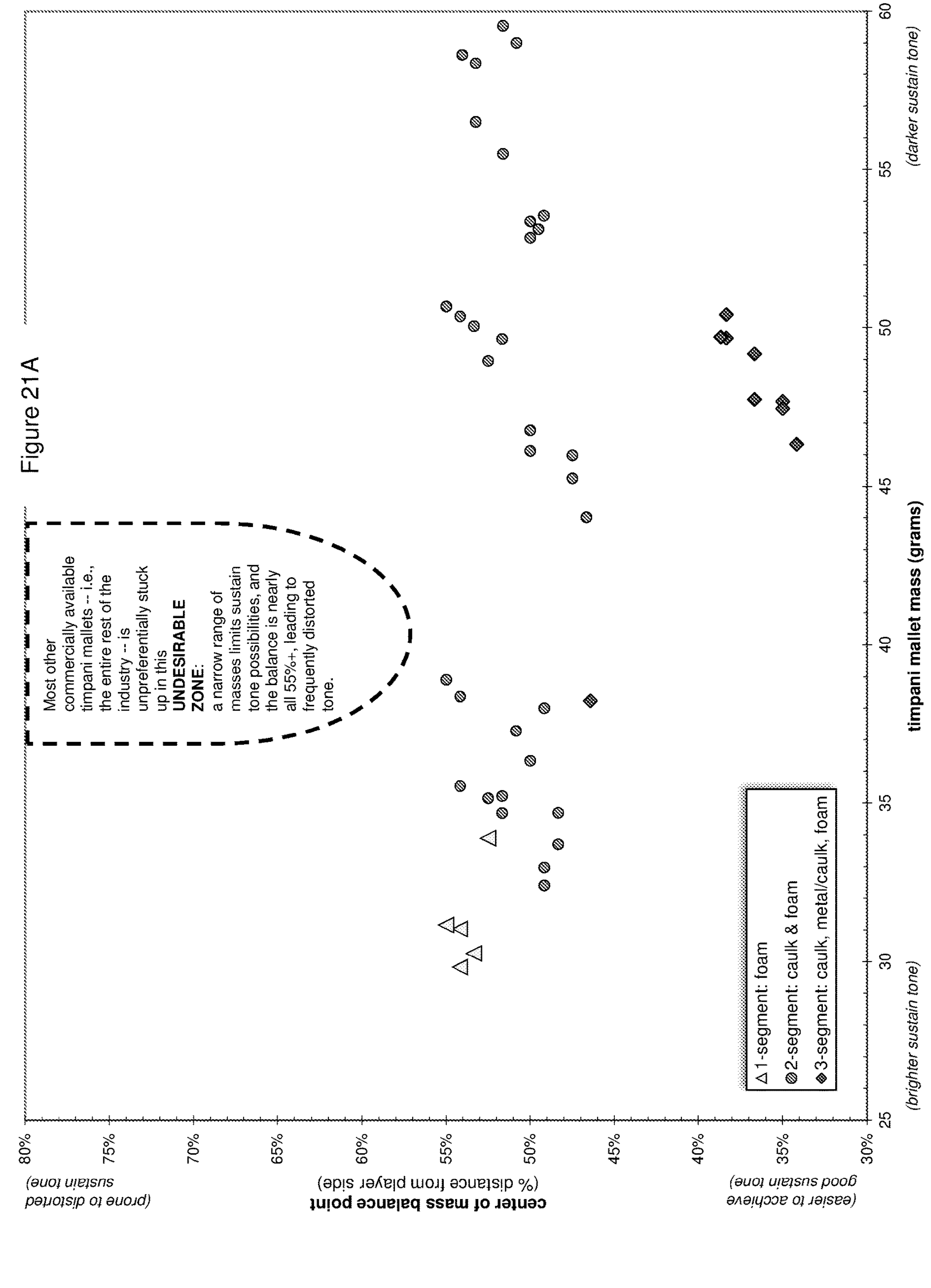
FIGS. 21A and 21B illustrate the mallet palette showing how different mallets have controlled balance point versus mass (21A) and articulation versus mass (21B). The same legend of symbols for different mallets is used for both 21A and 21B.
Figure 21B:
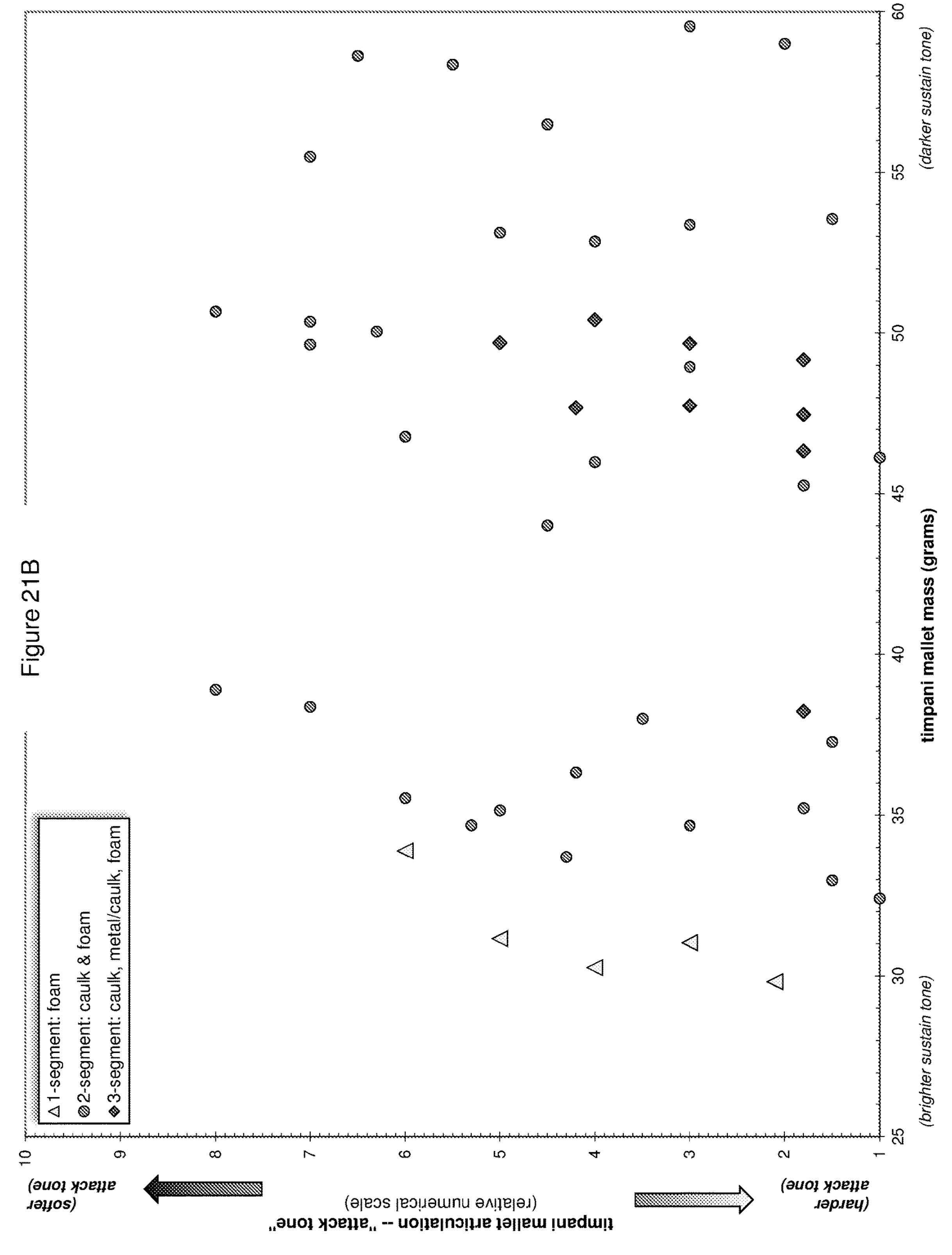

FIGS. 21A and 21B show further analysis of the inventive mallets as compared to typical prior art mallets in the industry. In FIG. 21A, balance point as a function of overall mass of the mallets is shown for both inventive mallets (three different types) and prior art mallets common in the industry. FIG. 21A shows providing a broader array of mallets. In FIG. 21B, articulation is shown as a function of overall mass of the mallets.

Figure 22:
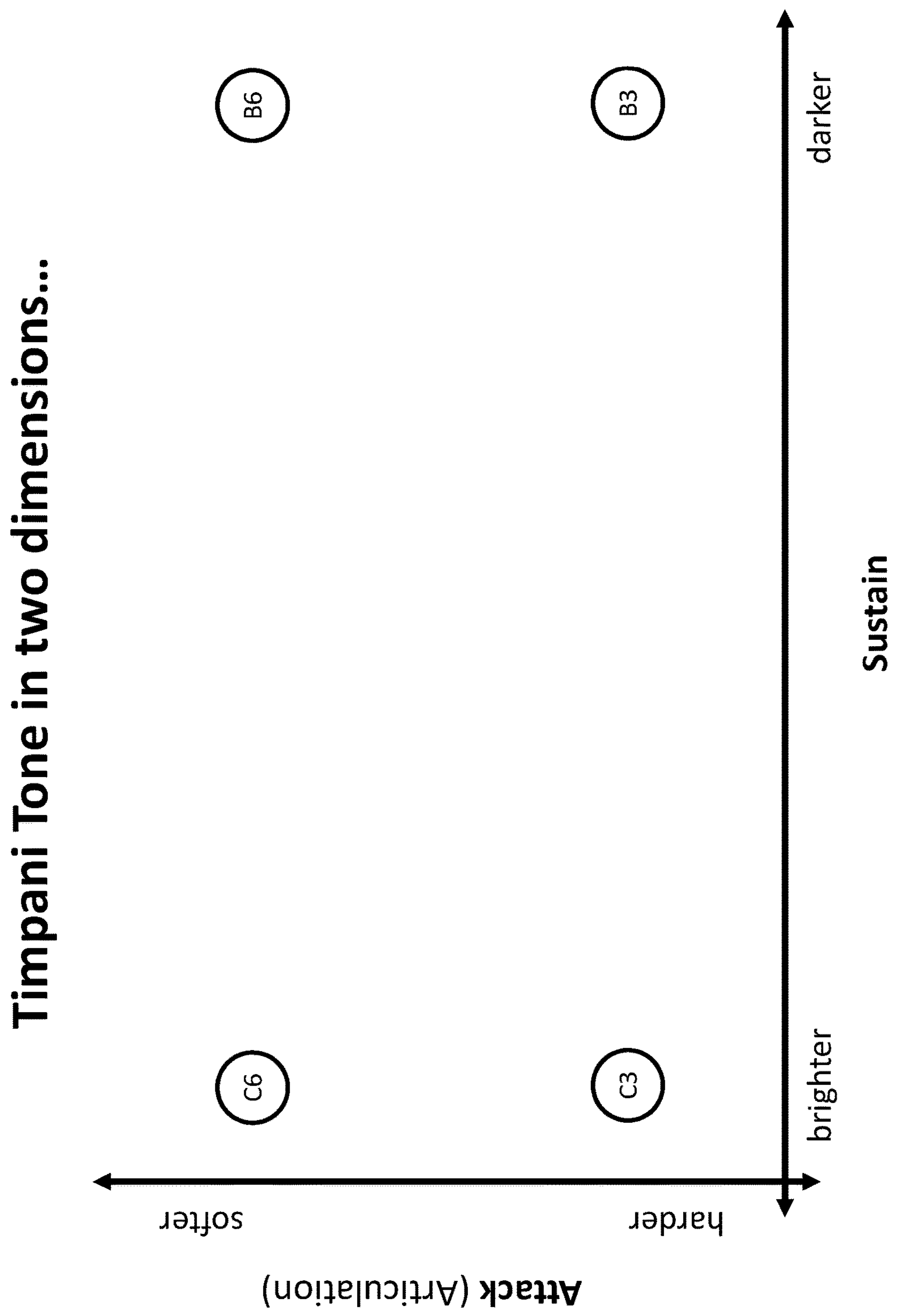
FIG. 22 shows four examples of different timpani mallets (labeled C3, C6, B6, and B3) occupying the two dimensional analysis of FIG. 1.
Figure 23:
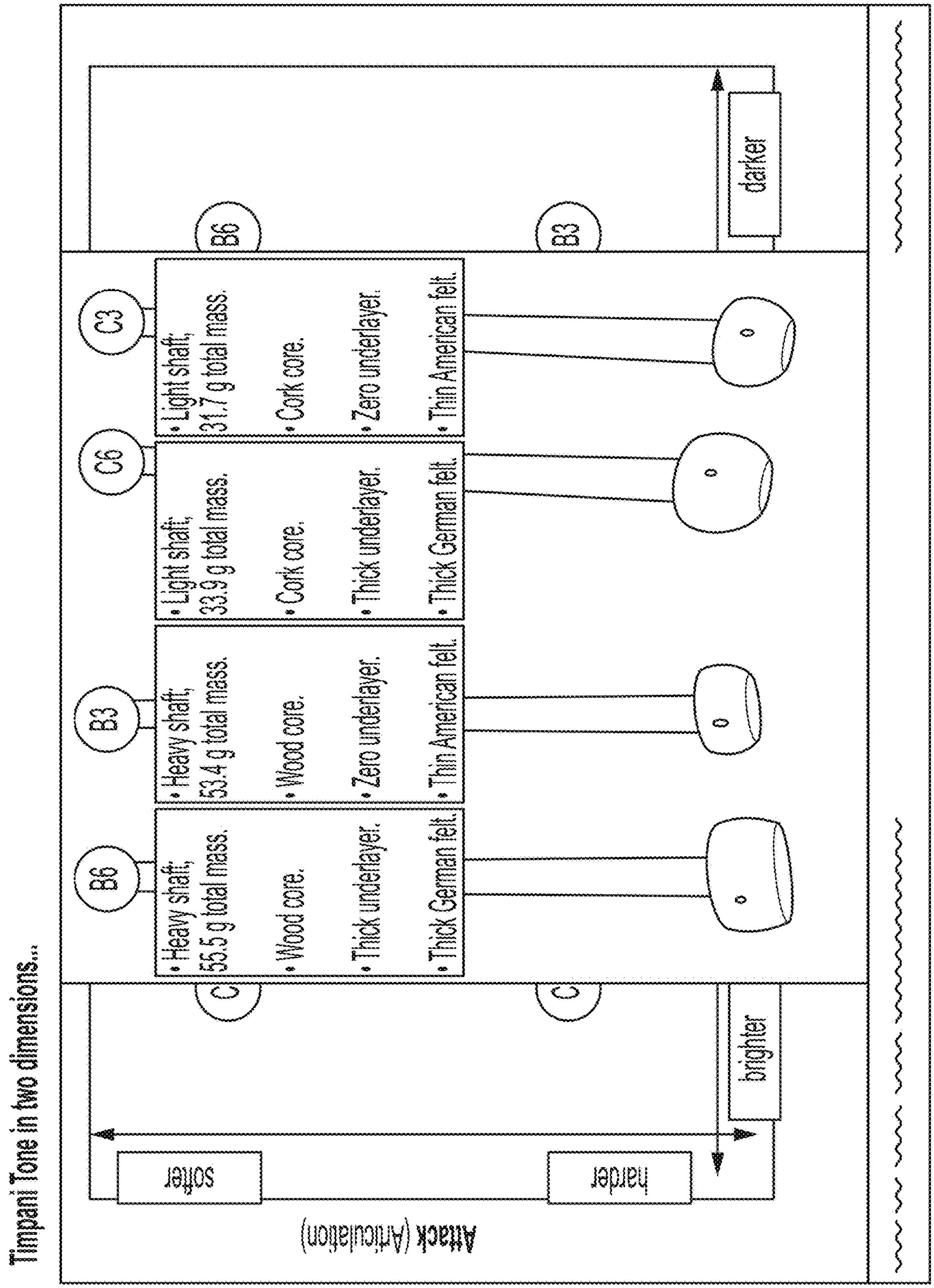
FIG. 23 shows the mallets for the four examples of the two dimensional analysis of FIGS. 1 and 22 (B3, B6, C3, and C6).

FIGS. 22 and 23 show further two dimensional analysis for four inventive mallets which are labeled B3, B6, C3, and C6.

The significant benefits of the inventive mallets were confirmed in sound files and recordings, including files and recordings for the examples of FIGS. 22 and 23.

As illustrated in FIGS. 21A and 21B, using the inventive methods, a mallet palette of several dozen mallets were prepared with masses ranging from 20-80 g, and varying degrees of articulation (darker to brighter). The shafts were either 0.5"×15" or 0.625"×15.5" and the cores were cork, tape, felt, light wood, heavy wood, or large wood. Additional embodiments include, for example, leather, rubberized cork, foam, foam-composite, plastic, and rubber.

FIG. 24 shows a flow chart for representative working examples for three types of timpani mallets. The third aspect is described more below.

Third Aspect

In a third aspect, a timpani percussion mallet is provided which is a timpani percussion mallet comprising a shaft comprising a single tube with a first end and with a second end, and also with outer walls and, contained within the outer walls, at least one segment having a density and made of a solid segment material, wherein the segment is non-movable within the tube, wherein the first end and the second end of the tube are open ends.

In one embodiment, contained within the outer walls is only the one segment having a density and made of a solid segment material. In one embodiment, the segment entirely fills the tube. In one embodiment, the first segment material comprises a foam.

A working example for the third aspect is provided in FIG. 24.

What is claimed is:

1. A timpani percussion mallet comprising:

a shaft of the timpani percussion mallet, the shaft comprising a carbon fiber tube, the carbon fiber tube having a first open end, a second open end, and an outer wall extending therebetween; and contained within the outer wall of the carbon fiber tube, a plurality of solid materials including a first solid material and a second solid material, the first solid material having a first constant diameter and a first longitudinal linear density, the second solid material different from the first solid material, and the second solid material having a second constant diameter and a second longitudinal linear density different from the first longitudinal linear density, wherein the first solid material and the second solid material are each non-movable within the carbon fiber tube, the first solid material comprises a polymer foam component adhered to the outer wall of the carbon fiber tube, the second solid material comprises a caulking material component adhered to the outer wall of the carbon fiber tube, the first solid material extends to the first open end of the carbon fiber tube, and the second solid material extends to the second open end of the carbon fiber tube, the first longitudinal linear density of the first solid material is constant along a longitudinal dimension of the carbon fiber tube at the first open end, the second longitudinal linear density of the second solid material is constant along the longitudinal dimension of the carbon fiber tube at the second open end, the first solid material and the second solid material each spanning an inner diameter of the carbon fiber tube, wherein the position and length of each of the first solid material and the second solid material within the outer wall of the carbon fiber tube is selectively configured to control center of mass, moment of inertia, and vibration mitigation for the timpani percussion mallet.

2. The timpani percussion mallet of claim 1, wherein at least one of the plurality of solid materials comprises at least two material components providing a radially nested gradient density.

3. The timpani percussion mallet of claim 1, wherein the plurality of solid materials includes a third solid material disposed between the first solid material and the second solid material.

4. The timpani percussion mallet of claim 3, wherein the third solid material has a longitudinal linear density different respective longitudinal linear densities of the first solid material and the second solid material.

5. The timpani percussion mallet of claim 1, wherein the plurality of solid materials contained within the outer wall of the carbon fiber tube entirely fill the carbon fiber tube.

6. The timpani percussion mallet of claim 1, wherein the first solid material includes a sprayable foam.

7. The timpani percussion mallet of claim 1, wherein the shaft has a shaft length of 300 mm to 440 mm, the shaft has a shaft diameter of 6 mm to 19 mm, and the outer wall has a thickness of 0.64 mm to 1.52 mm.

8. The timpani percussion mallet of claim 1, further comprising a core and a wrap, wherein the core and the wrap are each disposed along the carbon fiber tube.

9. The timpani percussion mallet of claim 1, wherein respective outer diameters of the first solid material and the second solid material are equal to one another.

10. The timpani percussion mallet of claim 1, wherein a wall thickness of the outer wall of the carbon fiber tube is uniform between the first open end and the second open end of the carbon fiber tube.

11. The timpani percussion mallet of claim 1, wherein an outer diameter of the outer wall of the carbon fiber tube is uniform between the first open end and the second open end of the carbon fiber tube.

12. A method of making a timpani percussion mallet, the method comprising:

providing a carbon fiber tube as an open tube having a first open end and a second open end, and an outer wall extending therebetween;

inserting two or more materials into the open tube, with each of the two or more materials having a respective constant diameter, a respective longitudinal linear density constant along a longitudinal dimension of the open tube, and each of the two or more materials spanning an inner diameter of the open tube;

with a dowel plunger having a diameter matching the inner diameter of the first open end and the second open end of the open tube, moving the two or more materials in the open tube to control position and length of the two or more materials in the open tube to control density gradient of the timpani percussion mallet; and curing the two or more materials in the open tube such that each one of the two or more materials adheres to the open tube, wherein the position and length of each of the two or more material within the open tube is selectively configured to control center of mass, moment of inertia, and vibration mitigation for the timpani percussion mallet.

13. The method of claim 12, wherein a sacrificial layer is used at an end of the dowel plunger moving the two or more materials in the open tube.

14. The method of claim 12, wherein the two or more materials include a first material and a second material, the first material has a first density, the second material has a second density different from the first density, and a first distance between the first material and the first open end is less than a second distance between the second material and the first open end.

15. The method of claim 12, wherein at least one of the one or more materials is inserted into the open tube as a semi-liquid.

16. A timpani percussion mallet comprising:

a shaft comprising a carbon fiber tube having a first open end, a second open end, and an outer wall extending therebetween;

a first material contained within the outer wall of the carbon fiber tube, the first material adhered to the carbon fiber tube, the first material extending to the first open end of the carbon fiber tube; and a second material contained within the outer wall of the carbon fiber tube, the second material different from the first material, the second material adhered to the carbon fiber tube and extending to the second open end of the carbon fiber tube, wherein the position and length of each of the first material and the second material within the open tube is selectively configured to control center of mass, moment of inertia, and vibration mitigation for the timpani percussion mallet.

17. The timpani percussion mallet of claim 16, wherein the first material is a polymer foam.

18. The timpani percussion mallet of claim 16, wherein the second material is caulking material.

* * * * *